(12) United States Patent
Kwak

(10) Patent No.: US 10,482,458 B2
(45) Date of Patent: Nov. 19, 2019

(54) USER EQUIPMENT, SERVICE PROVIDING DEVICE, PAYMENT SYSTEM COMPRISING THE SAME, CONTROL METHOD THEREOF AND NON-TRANSITORY COMPUTER-READABLE STORAGE MEDIUM STORING COMPUTER PROGRAM RECORDED THEREON

(71) Applicant: SK Planet Co., Ltd., Gyeonggi-do (KR)

(72) Inventor: Sebyung Kwak, Seoul (KR)

(73) Assignee: SK Planet Co., Ltd., Seongnam-si, Gyeonggi-do (KR)

( * ) Notice: Subject to any disclaimer, the term of this patent is extended or adjusted under 35 U.S.C. 154(b) by 564 days.

(21) Appl. No.: 15/254,650

(22) Filed: Sep. 1, 2016

(65) Prior Publication Data

US 2017/0068959 A1 Mar. 9, 2017

(30) Foreign Application Priority Data

Sep. 8, 2015 (KR) .......................... 10-2015-0126963
Sep. 8, 2015 (KR) .......................... 10-2015-0126964

(51) Int. Cl.
*G06Q 40/00* (2012.01)
*G06Q 20/38* (2012.01)
(Continued)

(52) U.S. Cl.
CPC .......... *G06Q 20/382* (2013.01); *G06Q 20/20* (2013.01); *G06Q 20/3224* (2013.01); *G06Q 20/34* (2013.01)

(58) Field of Classification Search
CPC .... G06Q 20/20; G06Q 20/3224; G06Q 20/34; G06Q 20/382
See application file for complete search history.

(56) References Cited

U.S. PATENT DOCUMENTS

2002/0007281 A1* 1/2002 Gil ................... G07B 17/00193
705/407
2004/0088567 A1* 5/2004 Lamotte ................ H04L 63/164
726/13
(Continued)

FOREIGN PATENT DOCUMENTS

KR 10-2004-0043900 A 6/2003

*Primary Examiner* — Thien M Le
(74) *Attorney, Agent, or Firm* — Fenwick & West LLP

(57) ABSTRACT

Provided are user equipment, a service providing device, a payment system including the same, a control method thereof, and a non-transitory computer-readable storage medium storing a computer program recorded thereon. According to the present invention, when one or more payment cards related with a user of user equipment registered in the user equipment are used, the user equipment collects various types of position information related with the user equipment and then provides the various types of collected position information to the service providing device, the service providing device compares current position information of the user equipment with various types of position information collected in the user equipment to determine whether the payment card is illegally used. Therefore, it is possible to verify illegal usage which steals the user equipment or steals position information of a store and increase reliability of determining illegal usage.

17 Claims, 11 Drawing Sheets

(51) Int. Cl.
*G06Q 20/34* (2012.01)
*G06Q 20/20* (2012.01)
*G06Q 20/32* (2012.01)

(56) References Cited

U.S. PATENT DOCUMENTS

2012/0190301 A1* 7/2012 Hart .................... H04M 1/7253
 455/41.2
2014/0095580 A1* 4/2014 Sartini .................. H04W 4/023
 709/203
2014/0310063 A1* 10/2014 Freeman ............ G06Q 30/0205
 705/7.34

* cited by examiner

USER EQUIPMENT, SERVICE PROVIDING DEVICE, PAYMENT SYSTEM COMPRISING THE SAME, CONTROL METHOD THEREOF AND NON-TRANSITORY COMPUTER-READABLE STORAGE MEDIUM STORING COMPUTER PROGRAM RECORDED THEREON

CROSS-REFERENCE TO RELATED APPLICATION

This application claims the benefit of Korean Application Nos. 10-2015-0126963 and 10-2015-0126964 filed on Sep. 8, 2015 with the Korean Intellectual Property Office, the disclosure of which is incorporated herein by reference.

BACKGROUND OF THE INVENTION

1. Field of the Invention

The present invention relates to user equipment, a service providing device, a payment system including the same, a control method thereof, and a non-transitory computer-readable storage medium storing a computer program recorded thereon. More particularly, the present invention relates to user equipment, a service providing device, a payment system including the same, a control method thereof, and a non-transitory computer-readable storage medium storing a computer program recorded thereon which receive a PIN number corresponding to a selected payment card in accordance with selection of a user after selecting a payment card for simple payment, check current position of the user equipment, check identification information of a store where the user equipment is located, provide information on a previously selected payment card, the received PIN number, the current position of the user equipment, and identification information of the store to the service providing device in the user equipment, and verify illegal use of the payment card based on the current position of the user equipment transmitted from the user equipment and the position information of the store corresponding to the identification information of the store in the service providing device.

2. Description of the Related Art

When any one credit card of a plurality of credit cards registered in user equipment is used to make a payment, a credit card having lots of benefits is selected among the plurality of credit cards to be suggested to a user and the user selects one of them to make a payment.

However, according to the card payment method described above, strict authentication procedure is not demanded to use a payment card. Therefore, when a card owner does not request to stop using lost payment card or stolen payment card, a third party may easily use the payment card to make a payment.

RELATED ART DOCUMENT

Patent Document

Korean Unexamined Patent Application Publication No. 10-2003-0043900 (entitled Method for detecting connection of illegal user by using connection environment information)

SUMMARY OF THE INVENTION

An object of the present invention is to provide user equipment, a service providing device, a payment system including the same, a control method thereof, and a non-transitory computer-readable storage medium storing a computer program recorded thereon in which, when one or more payment cards related with a user of user equipment registered in the user equipment are used, the user equipment collects various types of position information related with the user equipment and then provides the various types of collected position information to the service providing device, the service providing device compares current position information of the user equipment with various types of position information collected in the user equipment to determine whether the payment card is illegally used.

Another object of the present invention is to provide user equipment, a service providing device, a payment system including the same, a control method thereof, and a non-transitory computer-readable storage medium storing a computer program recorded thereon in which when the service providing device compares the current position information of the user equipment with various types of position information collected in the user equipment, pervious usage time information of one or more payment cards registered in the user equipment is reflected to determine whether the payment card is illegally used.

Still another object of the present invention is to provide user equipment, a service providing device, a payment system including the same, a control method thereof, and a non-transitory computer-readable storage medium storing a computer program recorded thereon which collects and analyzes a personal behavior pattern such as a time interval between information exchanging times or movement of the user which is detected by the user equipment which is a payment means with respect to a plurality of information exchanging times generated during a process of performing a pre-authentication type simple payment and then determines a possibility of illegal payment with respect to the analyzed result.

Another object of the present invention is to provide user equipment, a service providing device, a payment system including the same, a control method thereof, and a non-transitory computer-readable storage medium storing a computer program recorded thereon which measures a first time until a PIN number corresponding to a payment card selected by the user is received after selecting a payment card for simple payment when a user enters a store, measures a second time until actual payment in accordance with the selection of the product to be paid is confirmed after receiving the PIN number, and compares the measured first time and second time with the personal behavior pattern corresponding to a user of predetermined user equipment to verify the illegal use of the payment card in accordance with the comparison result.

According to an aspect of the present invention, a service providing device includes a communication unit which receives information on a payment card, a PIN number corresponding to the payment card, position information of user equipment, position information of one or more devices in the vicinity of the user equipment, and identification information of the user equipment which are transmitted from the user equipment; and a control unit which determines whether the position information of the user equipment is located within a predetermined radius from the position information of the one or more devices for primary verification, checks a type of a payment card which the most recently makes a payment, among one or more payments issued to the user equipment, payment date and time information, a payment store, and position information of the payment store when the position information of the user equipment is located within the predetermined radius from the position information of the one or more devices as a determination result, and performs secondary verification based on a distance difference between the position information of the user equipment and position information of the payment store where the payment is made by the most recently used payment card and a time difference between a present time and the payment date and time information when the payment is made by the most recently used payment card.

In an embodiment of the present invention, when the position information of the user equipment is not located within the predetermined radius from the position information of the one or more devices as the determination result, the control unit may generate authentication failure information and control the communication unit to transmit the generated authentication failure information to the user equipment.

In an embodiment of the present invention, when the position information of the user equipment is located within the predetermined radius from the position information of the one or more devices as the determination result but there is no payment card which makes a payment within a predetermined period, the control unit may maintain a stand-by status for simple payment.

In an embodiment of the present invention, the control unit may check whether the calculated distance difference and time difference are equal to or larger than predetermined reference values and suspect that the payment card is illegally used when the calculated distance difference and time difference are smaller than the predetermined reference values as a checking result to generate authentication failure information and control the communication unit to transmit the generated authentication failure information to the user equipment.

In an embodiment of the present invention, the control unit may check whether the calculated distance difference and time difference are equal to or larger than predetermined reference values and maintain a stand-by status for simple payment when the calculated distance difference and time difference are equal to or larger than the predetermined reference values as a checking result.

According to another aspect of the present invention, a control method of a service providing device includes receiving information on a payment card, a PIN number corresponding to the payment card, position information of user equipment, position information of one or more devices in the vicinity of the user equipment, and identification information of the user equipment which are transmitted from the user equipment by means of a communication unit; determining whether position information of the user equipment is located within a predetermined radius from position information of the one or more devices, by means of a control unit; checking a type of a payment card which the most recently makes a payment, among one or more payments issued to the user equipment, payment date and time information, a payment store, and position information of the payment store by means of the control unit when the position information of the user equipment is located within the predetermined radius from the position information of the one or more devices as a determination result; calculating a distance difference between the position information of the user equipment and position information of the payment store where the payment is made by the most recently used payment card and a time difference between a present time and the payment date and time information when the payment is made by the most recently used payment card, by means of the control unit; calculating a speed based on the calculated distance difference and time difference, by means of the control unit; checking whether the calculated speed is equal to or lower than a predetermined reference speed; and confirming that authentication is normally completed by determining there is an additional payment trial within a movable distance from the user equipment and maintaining a stand-by status for simple payment by means of the control unit when the calculated speed is equal to or lower than the reference speed as a checking result.

In an embodiment of the present invention, the method may further include: maintaining a stand-by status for simply payment, by means of the control unit, when the position information of the user equipment is located within the predetermined radius from the position information of the one or more devices as the determination result but there is no payment card which makes a payment within a predetermined period; generating authentication failure information, by means of the control unit, when the position information of the user equipment is not located within the predetermined radius from the position information of the one or more devices as the determination result; and transmitting the generated authentication failure information to the user equipment, by means of the communication unit.

In an embodiment of the present invention, the method may further include: generating authentication failure information, by means of the control unit, when the calculated speed is higher than the reference speed, as the checking result; and transmitting the generated authentication failure information to the user equipment, by means of the communication unit.

According to another aspect of the present invention, a computer program executing the methods according to the aforementioned embodiments may be stored in a non-transitory computer-readable storage medium storing a computer program recorded thereon.

According to still another aspect of the present invention, a payment system includes user equipment which selects one payment card among one or more payment cards registered to the user equipment and displayed on the use equipment, receives a PIN number corresponding to the selected payment card, checks position information of the user equipment, collects position information of one or more devices in the vicinity of user equipment, transmits information on selected payment card, the PIN number corresponding to the payment card, position information of the user equipment, the collected position information of one or more devices, and identification information of the user equipment; and a service providing device which checks a type of a payment card which the most recently makes a payment, among one or more payments issued to the user equipment, payment date and time information, a payment store, and position information of the payment store when the position information of the user equipment is located within a predetermined radius from the position information of the one or more devices, calculates a distance difference between the position information of the user equipment and position information of the payment store where the payment is made by the most recently used payment card and a time difference between a present time and the payment date and time information when the payment is made by the most recently used payment card, confirms that authentication is normally completed by determining there is an additional payment trial within a movable distance from the user equipment when the calculated distance difference and time difference are equal to or larger than predetermined reference values and maintains a stand-by status for simple payment.

In an embodiment of the present invention, when the calculated distance difference and time difference are smaller than predetermined reference values, the service providing device may suspect that the payment card is illegally used to generate authentication failure information and transmit the authentication failure information to the user equipment.

According to the present invention, when one or more payment cards related with a user of user equipment registered in the user equipment are used, the user equipment collects various types of position information related with the user equipment and then provides the various types of collected position information to the service providing device, the service providing device compares current position information of the user equipment with various types of position information collected in the user equipment to determine whether the payment card is illegally used. Therefore, it is possible to verify illegal usage which steals the user equipment or steals position information of a store and increase reliability of determining illegal usage.

Further, according to the present invention, when the service providing device compares current position information of the user equipment with various types of position information collected in the user equipment, previous usage time information of one or more payment cards registered in the user equipment is reflected to determine whether the payment card is illegally used. Therefore, the illegal usage may be verified through a plurality of steps and it may be used as information for recommending payment means or analyzing a consumption pattern.

Further, according to the present invention, time intervals between information exchanging times and personal behavior pattern such as movement of the user which is detected by the user equipment which is a payment means are collected with respect to a plurality of information exchanging times generated during a process of performing pre-authentication type simple payment are collected and analyzed, and then a possibility of illegal payment is determined based on the analyzed result, so that illegal use by a third party or illegal use by a hacking tool may be suppressed.

Further, according to the present invention, a first time until a PIN number corresponding to a payment card selected by the user is received is measured after selecting a payment card for simple payment when a user enters a store, a second time until actual payment in accordance with the selection of the product to be paid is confirmed after receiving the PIN number is measured, and the measured first time and second time are compared with the personal behavior pattern corresponding to a user of predetermined user equipment to verify the illegal use of the payment card in accordance with the comparison result. Therefore, it is possible to verify illegal usage which steals the user equipment or steals the position information of the store and reliability of determining illegal usage may be increased.

DETAILED DESCRIPTION OF THE PREFERRED EMBODIMENT

Figure 1:
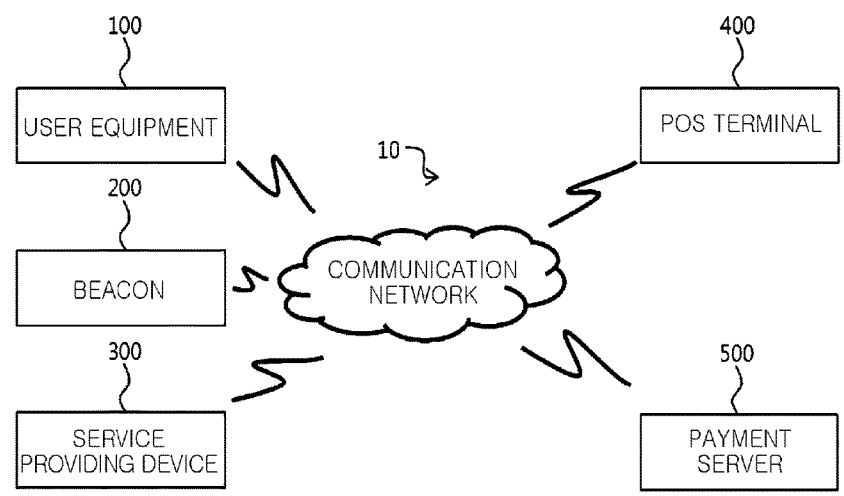
FIG. 1 is a block diagram illustrating a configuration of a payment system according to an exemplary embodiment of the present invention.

It is noted that technical terms used in the present invention are used to just describe a specific embodiment and do not intend to limit the present invention. Further, if the technical terms used in the present invention are not particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

In addition, singular expressions used in the present invention include plurals expressions unless they have definitely opposite meanings. In the present invention, it should not analyzed that a term such as "comprising" or "including" particularly includes various components or various steps disclosed in the specification and some component or some steps among them may not be included or additional components or steps may be further included.

In addition, terms including ordinal numbers, such as 'first' and 'second', used in the present invention can be used to describe various components, but the components should not be limited by the terms. The above terms are used only to discriminate one component from the other components. For example, a first component may be named a second component and similarly, the second component may also be named the first component, without departing from the scope of the present invention.

Hereinafter, preferable exemplary embodiment of the present invention will be described in more detail with reference to the accompanying drawings. Like reference numerals refer to like elements for easy overall understanding and a duplicated description of like elements will be omitted.

Further, in the following description, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

FIG. 1 is a block diagram illustrating a configuration of a payment system 10 according to an exemplary embodiment of the present invention.

As illustrated in FIG. 1, a payment system 10 is configured by user equipment 100, a beacon 200, a service providing device 300, a POS terminal 400, and a payment server 500. However, all the components of the payment system 10 illustrated in FIG. 1 are not essential components, but the payment system 10 may be implemented by more components or less components than the components illustrated in FIG. 1.

The user equipment 100 may be applied to various terminals such as a smart phone, a portable terminal, a mobile terminal, a personal digital assistant (PDA), a portable multimedia player (PMP) terminal, a telematics terminal, a navigation terminal, a personal computer, a notebook computer, a slate PC, a tablet PC, an ultrabook, a wearable device (for example, including a smart watch, a smart glass, or a head mounted display (HMD)), a Wibro terminal, an internet protocol television (IPTV) terminal, a 3D television, a home theater system, an audio video navigation terminal, an audio/video (A/V) system, or a flexible terminal.

Figure 2:
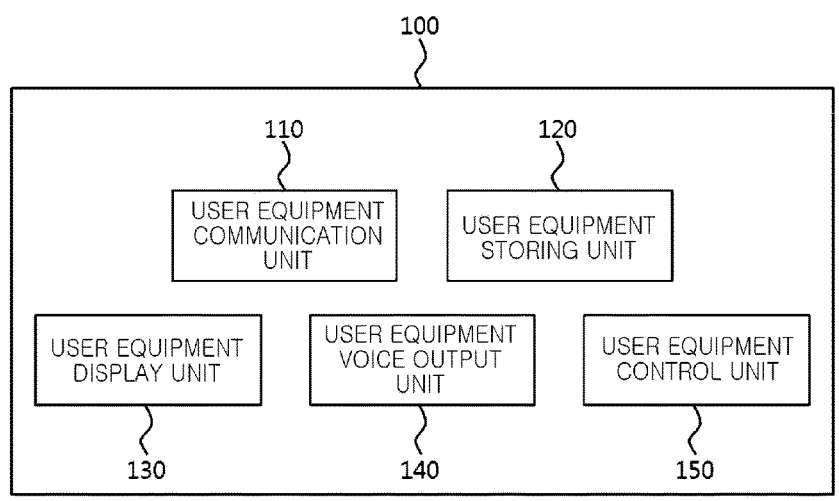
FIG. 2 is a block diagram illustrating a configuration of user equipment according to an exemplary embodiment of the present invention.

As illustrated in FIG. 2, the user equipment 100 is configured by a user equipment communication unit 110, a user equipment storing unit 120, a user equipment display unit 130, a user equipment voice output unit 140, and a user equipment control unit 150. However, all the components of the user equipment 100 illustrated in FIG. 2 are not essential components, but the user equipment 100 may be implemented by more components or less components than the components illustrated in FIG. 2.

The user equipment communication unit 110 connects an arbitrary internal component with at least one arbitrary external terminal through a wired/wireless communication network to communicate each other. In this case, the arbitrary external terminal may include the beacon 200, the service providing device 200, the POS terminal 400, and the payment server 500. Here, a wireless internet technique includes wireless LAN (WLAN), digital living network alliance (DLNA), wireless broadband (Wibro), world interoperability for microwave access (Wimax), high speed downlink packet access (HSDPA), high speed uplink packet access (HSUPA), IEEE 802.16, long term evolution (LTE), long term evolution-advanced (LTE-A), wireless mobile broadband service (WMBS). The user equipment communication unit 110 transmits and receives data in accordance with at least one wireless Internet technique within a range including Internet techniques which are not listed above. Further, a short range communication technology may include Bluetooth, RFID (radio frequency identification), IrDA (infrared data association), UWB (ultra-wideband), ZigBee, NFC (near field communication), USC (ultra sound communication), VLC (visible light communication), Wi-Fi, Wi-Fi direct or the like. Furthermore, the wired communication technique may include power line communication (PLC), USB communication, Ethernet, serial communication, an optical/coaxial cable, or the like.

The user equipment communication unit 110 may transmit information with any terminal through a universal serial bus (USB).

The user equipment communication unit 110 transmits and receives a wireless signal to and from a base station, the beacon 200, the service providing device 300, the POS terminal 400, and the payment serve 500 on a mobile communication network built according to technical standards for mobile communication or communication schemes (for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like).

Further, the user equipment communication unit 110 receives identification information (or unique identification information of a store provided with the beacon 200) of the beacon 200 which is transmitted from the beacon 200, by the control of the user equipment control unit 150.

The user equipment storing unit 120 stores various user interfaces UI and graphic user interfaces GUI.

Further, the user equipment storing unit 120 stores data and programs required to operate the user equipment 100.

That is, the user equipment storing unit 120 may store a plurality of application programs (or applications) which are driven in the user equipment 100 and data and commands for operation of the user equipment 100. At least some of the application programs may be downloaded from an external service providing device through wireless communication. Further, at least some of the application programs may be provided on the user equipment 100 since a releasing time in order to support a basic function (for example, phone call receiving and sending functions, message receiving and transmitting functions) of the user equipment 100. In the meantime, the application program is stored in the user equipment storing unit 120 and provided in the user equipment 100 to be driven to perform an operation (or a function) of the user equipment 100 by the user equipment control unit 150.

Further, the user equipment storing unit 120 may include at least one storing medium of a flash memory type, a hard disk type, a multimedia card micro type, a card type memory (for example, an SD or XD memory), a magnetic memory, a magnetic disk, an optical disk, a random access memory (RAM), a static random access memory (SRAM), a read-only memory (ROM), an electrically erasable programmable read-only memory (EEPROM), and a programmable read-only memory (PROM). Further, the user equipment 100 may operate a web storage which performs a storing function of the user equipment storing unit 120 on the Internet or operate in association with the web storage.

Further, the user equipment communication unit 120 stores identification information (or unique identification information of a store provided with the beacon 200) of the beacon 200 which is received through the user equipment communication unit 110, by the control of the user equipment control unit 150.

The user equipment display device 130 may display various contents such as various menu screens using a user interface and/or graphic user interface stored in the user equipment storing unit 120, by the control of the user equipment control unit 150. here, the contents displayed on the user equipment display unit 130 may include a menu screen including various texts, image data (including various information data), and data such as icons, list menus, or a combo boxes. The user equipment display unit 130 may be a touch screen.

Further, the user equipment display unit 130 may include at least one of a liquid crystal display (LCD), a thin film transistor liquid crystal display (TFT LCD), an organic light emitting diode (OLED), a flexible display, a field emission display (FED), a three dimensional display (3D display), an e-ink display, and a light emitting diode (LED).

Further, the user equipment display unit 130 may be configured as a stereoscopic display unit which displays a stereoscopic image.

A 3D display scheme such as a stereoscopic type (a glass type), an auto stereoscopic type (a glassless type), or a projection scheme (a holographic type) may be applied to the stereoscopic display unit.

Further, the user equipment display unit 130 displays identification information (or unique identification information of a store provided with the beacon 200) of the beacon 200 which is received through the user equipment communication unit 110, by the control of the user equipment control unit 150.

The user equipment voice output unit 140 outputs voice information included in a signal processed by the user equipment control unit 150. Here, the user equipment voice output unit 140 may include a receiver, a speaker, a buzzer, and the like.

Further, the user equipment voice output unit 140 outputs a guide voice generated by the user equipment control unit 150.

Further, the user equipment voice output unit 140 outputs voice information corresponding to identification information (or unique identification information of a store provided with the beacon 200) of the beacon 200 which is received through the user equipment communication unit 110, by the control of the user equipment control unit 150.

The user equipment control unit 150 performs an overall control function of the user equipment 100.

The user equipment control unit 150 performs an overall control function of the user equipment 100 using a program and data stored in the user equipment storing unit 120. The user equipment control unit 150 may include a RAM, a ROM, a CPU, a GPU, and a bus and the RAM, the ROM, the CPU, and the GPU are connected to each other through the bus. The CPU accesses the user equipment storing unit 120 to perform booting using an O/S stored in the user equipment storing unit 120 and performs various operations using various programs, contents, and data stored in the user equipment storing unit 120.

Further, the user equipment control unit 150 interlocks with the service providing device 300 to perform a member joining procedure for the user of the user equipment 100.

When the member joining procedure is performed, the user equipment control unit 150 normally completes the member joining procedure for the service providing device 300 only by completing the authentication function through a self-authentication unit (for example, including a mobile phone, a credit card, I-PIN, e-mail, and the like).

Further, when a user who carries the user equipment 100 enters a store, the user equipment control unit 150 controls the user equipment communication unit 110 to receive the identification information (or unique identification information of a store provided with the beacon 200) of the beacon 200 transmitted from the beacon 200.

Further, the user equipment control unit 150 transmits the received unique identification information of the beacon 200 (or the unique identification information of a store provided with the beacon 200) and identification information of the user equipment 100 to the service providing device 300 through the user equipment communication unit 110. Here, the identification information of the user equipment 100 includes a mobile directory number (MDN), a mobile IP, a mobile MAC, a subscriber identify module (Sim) card unique information, and a serial number.

Further, when a user of the user equipment control unit 150 is not a member who is registered in advance in the service providing device 300, the user equipment control unit 150 performs the member joining procedure for the user equipment 100 (or a user of the user equipment 100) based on guide information related with the member joining procedure provided from the service providing device 300.

Further, when the user of the user equipment control unit 150 is a member who is registered in advance in the service providing device 300, the user equipment control unit 150 receives one or more advertisement information, one or more benefit information, or a recommended card list transmitted from the service providing device 300 in response to the transmitted unique identification information (or unique identification information of a store provided with the beacon 200) of the beacon 200 and the identification information of the user equipment 100 through the user equipment communication unit 110. Here, the benefit information includes coupon information, membership benefit information, and discount benefit information. Further, the recommended card list includes at least one card to which the benefit information is applied, among a plurality of cards (or one or more cards) which is issued in advance to the user equipment 100.

Further, the user equipment control unit 150 outputs at least one of the received advertisement information, benefit information, and recommended card list through the user equipment display unit 130 and/or the user equipment voice output unit 140.

Further, the user equipment control unit 150 checks one payment card (or unique identification information of the payment card) selected from the plurality of payment cards which is registered (or issued) in a specific app which is installed in advance in the user equipment 100.

The user equipment control unit 150 may checks the payment card selected from the recommended card list transmitted from the service providing device 300.

The user equipment control unit 150 may create the recommended card list including at least one card to which the benefit information may be applied, among a plurality of payment cards which is registered in advance in the user equipment 100, based on one or more benefit information provided from the service providing device 300 and display the created recommended card list on the user equipment display unit 130. Further, the user equipment control unit 150 may check one payment card selected from the recommended card list displayed on the user equipment display unit 130.

The user equipment control unit 150 receives a pin number (personal identification number) in accordance with the user input through a specific app which is installed in advance in the user equipment 100. Here, the PIN number may be a PIN number corresponding to the checked payment card type.

Further, the user equipment control unit 150 transmits the checked payment card type (or unique identification information of the payment), the PIN number, and the identification information of the user equipment 100 to the service providing device 300 through the user equipment communication unit 110.

The user equipment control unit 150 receives a token transmitted from the service providing device 300 in response to the PIN number which is transmitted in advance, through the user equipment communication unit 110.

The user equipment control unit 150 creates a barcode (or a quick response code (QR code)) including the received token (or token information) and the identification information of the user equipment 100.

The user equipment control unit 150 stores the created barcode (or QR code) in the user equipment storing unit 120.

When a predetermined method is selected as a payment method through a specific app which is installed in advance in the user equipment 100, the user equipment control unit 150 transmits the barcode information (or the QR code information) corresponding to the barcode (or a QR code) which is previously created to the POS terminal 400 through the user equipment communication unit 110. Here, the barcode information corresponding to the barcode (or QR code information corresponding to the QR code) includes the token (or token information) or identification information of the user equipment 100. In this case, the payment method includes cash payment, credit card payment, or electronic payment and the predetermined method may be electronic payment.

As described above, when the user equipment 100 and the POS terminal 400 are connected through a wired/wireless communication scheme, the barcode information (or QR code information) may be transmitted from the user equipment 100 to the POS terminal 400.

In contrast, when the user equipment 100 and the POS terminal 400 are not connected through a wired/wireless communication scheme, if the user of the user equipment 100 selects a payment method which is set in advance through a specific app which is installed in advance in the user equipment 100, a barcode (or a QR code) displayed on the user equipment display unit 130 may be recognized (or scanned/tagged) by the POS terminal 400.

Further, after performing a payment function on one or more products to be paid which are selected by a user of the user equipment 100 based on the barcode information (or the QR code information) which is previously transmitted, the user equipment control unit 150 receives a payment function performing result transmitted from the POS terminal 400 (or the service providing device 300) through the user equipment communication unit 110 in response to the barcode information (or the QR code information) which is previously transmitted.

Further, the user equipment control unit 150 outputs the received payment function performing result through the user equipment display unit 130 and/or the user equipment voice output unit 140.

Further, the user equipment 100 may further include an interface unit (not illustrated) which functions as an interface with all external apparatuses which are connected to the user equipment 100. For example, the interface unit may be configured by a wired/wireless headset port, an external charger port, a wired/wireless data port, a memory card port, a port connecting devices with identification modules, an audio input/output (I/O) port, a video input/output (I/O) port, an earphone port, and the like. Here, the identification module is a chip which stores various information for authenticating a permission of the user equipment 100 and may include a user identity module (UIM), a subscriber identity module (SIM), a universal subscriber identity module (USIM), and the like. Further, the device provided with the identification module may be prepared in a smart card form. Accordingly, the identification module may be connected with the user equipment 100 through the port. Such an interface unit receives data or power from an external device to transmit the received data or power to each component in the user equipment 100 or transmit the data in the user equipment 100 to the external device.

Further, the interface unit may be a passage through which the power from a cradle is supplied to the corresponding user equipment 100 when the user equipment 100 is connected to an external cradle or a passage through which various command signals input from the cradle by the user is transferred to the corresponding user equipment 100. Various command signals input from the cradle or the corresponding power may also operate by a signal for recognizing that the user equipment 100 is accurately installed on the cradle.

Further, the user equipment 100 may further include an input unit (not illustrated) for receiving a signal according to a button operation of the user or any function selection or receiving a command or a control signal created by an operation such as an operation of touching/scrolling the displayed screen.

The input unit is a means for receiving at least one of a user's command, selection, data, and information and may include a plurality of input keys and function keys for receiving figure or text information and setting various functions.

Further, the input unit may use various devices such as a key pad, a dome switch, a touch pad (a pressure resistive type/a capacitive resistive type), a touch screen, a jog wheel, a jog switch, a jog shuttle, a mouse, a stylus pen, and a touch pen. Particularly, when the user equipment display unit 130 is formed in a touch screen form, some or all of the input functions may be performed by the user equipment display unit 130.

Further, each component unit (or each module) of the user equipment 100 may be software stored on a memory (or the user equipment storing unit 120) of the user equipment 100. The memory may be an internal memory of the user equipment 100 and may an external memory or other types of storing devices. Further, the memory may be a non-volatile memory. The software stored on the memory may include a command set to allow the user equipment 100 to perform a specific operation while executing.

The beacon 200 communicates with the user equipment 100 and the POS terminal 400.

Further, the beacon 200 receives store information relate with the store provided with the beacon 200 or unique identification information of the store provided with the beacon 200 transmitted from the POS terminal 400.

The beacon 200 broadcasts (or transmits) store information or the identification information (or unique identification information of the store provided with the beacon 200) of the beacon 200.

The service providing device 300 communicates with the user equipment 100, the POS terminal 400, and the payment server 500.

The service providing device 300 may include a communication unit (not illustrated), a storing unit (not illustrated), a display unit (not illustrated), a voice output unit (not illustrated), and a control unit (not illustrated) corresponding to the user equipment communication unit 110, the user equipment storing unit 120, the user equipment display unit 130, the user equipment voice output unit 140, the user equipment control unit 150 included in the user equipment 100, respectively.

Further, the service providing device 300 interlocks with the user equipment 100 to perform a member joining procedure for the user of the user equipment 100.

Further, the service providing device 300 receives the unique identification information of the beacon 200 and the identification information of the user equipment 100 transmitted from the user equipment 100.

Further, the service providing device 300 determines (or checks) whether the user corresponding to the user equipment 100 is a member who is registered (joined) in advance in the service providing device 300 based on the received identification information of the user equipment 100.

When the user corresponding to the user equipment 100 is not a member who is registered in advance in the service providing device 300 as a result of determination (or a checking result), the service providing device 300 transmits guide information related with the member joining procedure to the user equipment 100.

Further, the service providing device 300 interlocks with the user equipment 100 to perform a member joining procedure for the user equipment 100 (or the user of the user equipment 100).

Further, when the user corresponding to the user equipment 100 is a member who is registered in advance in the service providing device 300 as a determination result (or a checking result), the service providing device 300 checks one or more advertisement information and one or more benefit information which may be provided to the user equipment 100 in the store provided with the beacon 200, among a plurality of advertisement information and a plurality of benefit information which are stored in advance based on the unique identification information of the beacon 200 which is previously received and the identification information of the user equipment 100.

Further, the service providing device 300 creates a recommended card list including one or more recommended cards to which the benefit information may be applied (or reflected) among a plurality of cards issued to the user equipment 100, based on one or more checked benefit information. Here, the benefit information includes coupon information, membership benefit information, and discount benefit information.

The service providing device 300 transmits one or more advertisement information, one or more benefit information, and a recommended card list including one or more recommended cards which may be provided to the user equipment 100 in the store provided with the checked beacon 200 to the user equipment 100.

That is, when the user corresponding to the user equipment 100 is a member who is registered in advance in the service providing device 300, the service providing device 300 checks store information corresponding to the unique identification information of the beacon 200 among store information for every unique identification information of the plurality of beacons which is stored in advance. Further, the service providing device 300 checks one or more advertisement information and benefit information which may be provided to the user equipment 100 in the store based on the checked store information and the received identification information of the user equipment 100. Further, the service providing device 300 creates the recommended card list including at least one card to which the benefit information is applied, among a plurality of cards (or one or more cards) which is previously issued to the user equipment 100. Further, the service providing device 300 transmits one or more checked advertisement information, one or more checked benefit information, and the created recommended card list to the user equipment 100.

Further, the service providing device 300 receives the payment card type, the PIN number, and the identification information of the user equipment 100 transmitted from the user equipment 100.

Further, the service providing device 300 creates a token (a one-time token, token information, or temporary token) corresponding to the received PIN number. Here, the token is a temporary token and is randomly created corresponding to the PIN number. Further, a usage count or a usage duration may be set in advance. In this case, the service providing device 300 may create a token corresponding to the received PIN number and the payment card type.

Further, the service providing device 300 manages (or stores) the created token by interlocking with the payment card type, the PIN number, and the identification information of the user equipment 100.

Further, the service providing device 300 transmits the created token (or a token corresponding to the PIN number or a token corresponding to the PIN number and the payment card type) to the user equipment 100.

Further, the service providing device 300 receives the barcode information (or QR code information) transmitted from the payment server 500, to perform the authentication function for the user before performing the payment function on one or more products to be paid which are selected by the user of the user equipment 100.

Further, the service providing device 300 checks whether the token in the barcode information (or the QR code information) is valid, based on the token in the received barcode information (or QR code information) and the identification information of the user equipment 100.

That is, the service providing device 300 checks whether the token in the received barcode information (or QR code information), a token corresponding to the identification information of the user equipment 100, and identification information of the user equipment are included (or present) in the identification information of the user equipment for each of the plurality of tokens stored in advance (or issued in advance).

As described above, the service providing device 300 may verify the validity of the issued token.

When the token in the received barcode information (or QR code information), the token corresponding to the identification information of the user equipment 100, and identification information of the user equipment are not included in the identification information of the user equipment for each of the plurality of tokens which is stored in advance in the service providing device 300 as a checking result, that is, when the token in the received barcode information (or the QR information) is not valid, the service providing device 300 transmits authentication failure information to the payment server 500.

When the token in the received barcode information (or QR code information), the token corresponding to the identification information of the user equipment 100, and identification information of the user equipment are included in the identification information of the user equipment for each of the plurality of tokens which is stored in advance in the service providing device 300 as a checking result, that is, when the token in the received barcode information (or the QR information) is valid, the service providing device 300 transmits card information, user information, benefit information corresponding to the identification information of the user equipment 100 in the received barcode information (or QR code information) to the payment server 500. In this case, the service providing device 300 may transmit card information, user information, and benefit information corresponding to the payment card type related with a valid token (or the payment card type checked based on the token created corresponding to the PIN number and the payment card type/PIN number is managed by interlocking with the token, payment card type, and payment card type checked based on the identification information of the user equipment) to the payment server 500. Here, the card information includes a card number, an expiration date, a card verification code (CVC) number, and a user name. The user information includes a user name, birth date, an address, and an image. Further, the benefit information includes coupon information, membership benefit information, and discount benefit information.

That is, when the token in the received barcode information (or QR code information) is valid as the checking result, the service providing device 300 checks the card information, the user information, and the benefit information stored in advance in the service providing device 300 related with the user (or the user equipment 100) corresponding to the identification information of the user equipment 100 in the received barcode information (or QR code information) and transmits the checked card information, user information, and benefit information to the payment server 500. In this case, the service providing device 300 checks the card information, the user information, and the benefit information corresponding to the payment card type which is previously transmitted from the user equipment 100 and transmits the checked card information, user information, and benefit information to the payment server 500.

Further, the service providing device 300 receives a payment function performed result (or payment information) transmitted from the payment server 500.

Further, the service providing device 300 stores the received payment function performed result by interlocking with the identification information of the user equipment 100.

Further, the service providing device 300 may transmit the received payment function performed result to the user equipment 100 corresponding to the identification information of the user equipment 100.

Further, the service providing device 300 may be implemented in a form such as a web server, a database server, and a proxy server. Further, in the service providing device 300, one or more of various software which allows a network load distribution mechanism or a service providing device 300 to operate on the Internet or other networks may be installed, and as a result, the service providing device 300 may be implemented by a computerized system. Further, the network may be an http network and may be a private line, Intranet, or any other networks. Furthermore, the service providing device 300 and the user equipment 100 may be connected to each other by a security network so as to suppress the data from being attacked by any hacker or other third parties. Further, the service providing device 300 may include a plurality of database servers. The database server may be implemented to be separately connected with the service providing device 300 through any type of network connection including a distributed database server architecture.

A processor mounted in the user equipment 100 or the service providing device 300 according to the exemplary embodiment of the present invention may process the program command to execute the method according to the exemplary embodiment of the present invention. In an implemented embodiment, the processor may be a single-threaded processor. In another implemented embodiment, the processor may be a multi-threaded processor. Further, the processor may process the command stored on the memory or the storing device.

The point of sales (POS) terminal 400 communicates with the user equipment 100, the beacon 200, the service providing device 300, and the payment server 500.

Further, the POS terminal 400 may include a communication unit (not illustrated), a storing unit (not illustrated), a display unit (not illustrated), a voice output unit (not illustrated), and a control unit (not illustrated) corresponding to the user equipment communication unit 110, the user equipment storing unit 120, the user equipment display unit 130, the user equipment voice output unit 140, the user equipment control unit 150 included in the user equipment 100, respectively.

Further, the POS terminal 400 transmits store information relate with the store provided with the beacon 200 or unique identification information of the store provided with the beacon 200 to the beacon 200.

The POS terminal 400 scans (or recognizes a barcode attached on a product to be paid) one or more products (or payment products) to be paid which are selected by the user of the user equipment 100.

The POS terminal 400 displays product information on one or more scanned (or recognized) products to be paid. Here, the product information includes a product name, a unique product code, a unit price, an amount, a price, a total price, and the like.

In contrast, when the user equipment 100 and the POS terminal 400 are not connected through a wired/wireless communication scheme, if the user of the user equipment 100 selects a payment method which is previously set through a specific app which is installed in advance in the user equipment 100, the POS terminal 400 recognizes (or scans/tags) a barcode (or a QR code) displayed on the user equipment display unit 130.

Further, the POS terminal 400 receives the barcode information (or the QR code information) transmitted from the user equipment 100.

When the POS terminal 400 recognizes a barcode (or a QR code) displayed on the user equipment 100, the POS terminal 400 checks the recognized barcode information (or the QR code information).

The POS terminal 400 displays or stores the received (or checked) barcode information (or QR code information).

The POS terminal 400 transmits information on one or more products to be paid (or recognized product information to be paid), barcode information (or QR code information), and the identification information of the POS terminal 400 to the payment server 500.

The POS terminal 400 may receive authentication failure information transmitted from the payment server 500 in response to the barcode information (or QR code information) transmitted to the payment server 500.

The POS terminal 400 displays the received authentication failure information.

Further, the POS terminal 400 may transmit the received authentication failure information to the user equipment 100.

Further, the POS terminal 400 receives user information transmitted from the payment server 500 immediately before performing a payment function on one or more products selected by the user of the user equipment 100 based on the barcode information (or QR code information) transmitted to the payment server 500. Here, the user information includes a user name, birth date, address, and an image related with the user corresponding to the identification information of the user equipment 100.

The POS terminal 400 displays the received user information.

Further, the user of the POS terminal 400 checks an image in the user information displayed on the POS terminal 400 and the user of the user equipment 100 which makes a payment on the product. Thereafter, when the image in the user information matches the user of the user equipment 100, the POS terminal 400 receives information indicating the user matching in accordance with the user input of the POS terminal 400.

The POS terminal 400 transmits received information indicating the user matching, and identification information of the POS terminal 400 to the payment server 500.

Further, when a payment function on one or more products selected by the user of the user equipment 100 is normally performed based on the barcode information (or QR code information) transmitted to the payment server 500, the POS terminal 400 receives a payment function performed result (or payment information) which is transmitted from the payment server 500 in response to the barcode information (or the QR code information) transmitted to the payment server 500. Here, the payment function performed result (or the payment information) includes a product name, a unique product code, a unit price, an amount, a discounted price, whether to apply a coupon, a price, a total price, payment date and time information, and a payment card type.

The POS terminal 400 transmits the received payment function performed result to the user equipment 100.

Further, the POS terminal 400 may output the received payment function performed result through a printed matter such as a receipt.

The payment server 500 communicates with the user equipment 100, the service providing device 300, and the POS terminal 400.

Further, the payment server 500 may include a communication unit (not illustrated), a storing unit (not illustrated), a display unit (not illustrated), a voice output unit (not illustrated), and a control unit (not illustrated) corresponding to the user equipment communication unit 110, the user equipment storing unit 120, the user equipment display unit 130, the user equipment voice output unit 140, the user equipment control unit 150 included in the user equipment 100, respectively.

The payment server 500 receives information on one or more products to be paid (or recognized product information to be paid), barcode information (or QR code information), and the identification information of the POS terminal 400 transmitted from the POS terminal 400.

Further, the payment server 500 transmits the received barcode information (or QR code information) to the service providing device 300 in order to perform an authentication procedure related with the user equipment 100.

When the token in the barcode information (or the QR information) which is transmitted to the service providing device 300 is not valid, the payment server 500 receives authentication failure information which is transmitted from the service providing device 300 in response to the barcode information (or the QR information) which is transmitted to the service providing device 300.

Further, the payment server 500 transmits the received authentication failure information to the POS terminal 400.

When the token in the barcode information (or the QR information) which is transmitted to the service providing device 300 is valid, the payment server 500 receives card information, user information, or benefit information (or card information, user information, or benefit information corresponding to the identification information of the user equipment 100 in the barcode information (or the QR information)) which is transmitted from the service providing device 300 in response to the barcode information (or the QR information) which is transmitted to the service providing device 300.

The payment server 500 performs a payment function on the payment amount corresponding to one or more product information to be paid based on the received card information, user information, and benefit information. In this case, the payment server 500 may perform a payment function on a payment amount obtained by applying a benefit amount corresponding to the benefit information transmitted from the service providing device 300 (or benefit information which may be applied to the user of the user equipment 100) to price information on one or more products to be paid.

In this case, immediately before performing the payment function, the payment server 500 transmits the user information transmitted from the service providing device 300 to the POS terminal 400.

When the image in the user information does not match the user of the user equipment 100 who make a payment on the product, the payment server 500 transmits payment cancel information on the one or more product information to the POS terminal 400 or performs the payment function after performing additional authentication procedure on the user equipment 100.

When the image in the user information matches the user of the user equipment 100 who make a payment on the product, the payment server 500 receives the information indicating that the user matches the image transmitted from the POS terminal 400 and the identification information of the POS terminal 400, in response to the user information transmitted to the POS terminal 400.

The payment server 500 performs a payment function on the payment amount corresponding to one or more product information to be paid based on the received card information, user information, benefit information, and the information indicating that the user matches the image.

The payment server 500 transmits the payment function performed result (or payment information) to the POS terminal 400 and the service providing device 300. Here, the payment function performed result (or the payment information) includes a product name, a unique product code, a unit price, an amount, a discounted price, whether to apply a coupon, a price, a total price, payment date and time information, and a payment card type.

Figure 3:
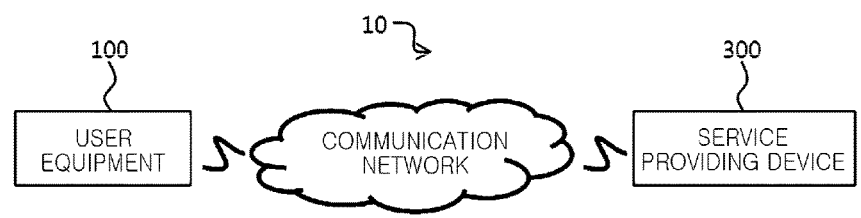
FIG. 3 is a block diagram illustrating a configuration of a payment system according to another exemplary embodiment of the present invention.

FIG. 3 is a block diagram illustrating a configuration of a payment system 10 according to another exemplary embodiment of the present invention.

As illustrated in FIG. 3, the payment system 100 is configured by user equipment 100 and a service providing device 300. However, all the components of the payment system 10 illustrated in FIG. 3 are not essential components, but the payment system 10 may be implemented by more components or less components than the components illustrated in FIG. 3.

After selecting a payment card for simple payment and receiving a PIN number corresponding to the payment card, the user equipment 100 collects position information of the user equipment 100 and position information of one or more devices located in a region where the user equipment 100 is located. Thereafter, the user equipment 100 transmits information on the previously selected payment card, the PIN number corresponding to the payment card, the collected position information of the user equipment 100, the collected position information of one or more devices, and identification information of the user equipment 100 to the service providing device 300. Thereafter, the position information of one or more devices and the position information of the user equipment 100 are compared. When the position of the user equipment 100 is present in an area corresponding to the position information of the device and payment date and time information and position information of the payment store in accordance with a payment card which the most recently makes a payment (or used) among one or more payment cards issued (or registered) to the user equipment 100 correspond to a movable range within a predetermined movement time per unit distance in the user equipment 100, the service providing device 300 confirms that authentication is normally completed and maintains a stand-by status (or check-in status) for simple payment.

Further, the user equipment 100 measures a first time from a time when a user who carries the user equipment 100 enters a store to a time when the user receives the PIN number corresponding to the payment card and a second time from a time when the user receives the PIN number to a time when the user confirms the payment. Further, the user equipment 100 measures a movement distance where the user moves from the time when the user enters the store to the time when the user confirms the payment and tracks a movement route. Thereafter, the user equipment 100 transmits the measured first time, second time, movement distance, movement route, and the identification information of the user equipment 100 to the service providing device 300. Thereafter, the service providing device 300 compares the first time, the second time, the movement distance, and the movement route with a plurality of predetermined reference values to perform an additional authentication procedure or perform a payment function by interlocking with the user equipment 100 as a comparison result.

Figure 4:
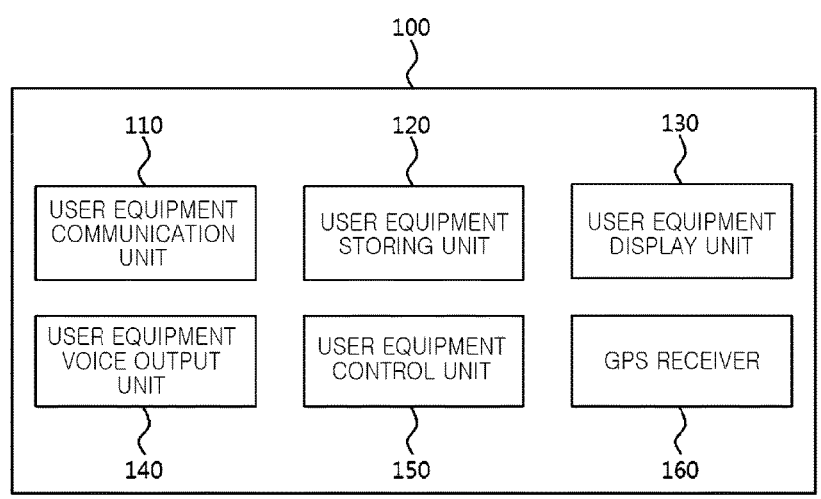
FIG. 4 is a block diagram illustrating a configuration of user equipment according to another exemplary embodiment of the present invention.

As illustrated in FIG. 4, the user equipment 100 is configured by a user equipment communication unit 110, a user equipment storing unit 120, a user equipment display unit 130, a user equipment voice output unit 140, a user equipment control unit 150, and a GPS receiver 160.

The GPS receiver 160 receives a GPS signal transmitted from the satellite and generates (or creates/checks) position data of the user equipment 100 at real time based on a longitude coordinate and a latitude coordinate included in the received GPS signal. The generated position data is defined as the current position (or current position data) of the user equipment 100. Here, the position information may be received through Wi-Fi or Wibro communication in addition to the GPS receiver 160.

Further, the signal received through the GPS receiver 160 may be configured to provide position information of the terminal to the user equipment 100 using a wireless communication scheme such as 802.11 which is a standard of a wireless network of a wireless LAN suggested in institute of electrical and electronics engineers (IEEE) and a wireless LAN including some of infrared communication, 802.15 which is a standard of a wireless personal area network (PAN) including Bluetooth, UWB, and Zigbee, 802.16 which is a standard of wireless metropolitan area network (MAN) including fixed wireless access (FWA) and broadband wireless access (BWA), and 802.20 which is a standard for mobile Internet of mobile broadband wireless access (MBWA) including Wibro and WiMAX.

When a payment card needs to be selected in accordance with user input (or user selection) and a PIN number corresponding to the selected payment card needs to be received, the user equipment control unit 150 selects one (or a plurality of) payment card among one or more payment cards which are issued (or registered) to the user equipment 100 displayed on the user equipment display device 130.

Further, the user equipment control unit 150 receives a PIN number corresponding to the selected payment card in accordance with the user input.

The user equipment control unit 150 collects position information of the user equipment 100 and position information of one or more devices (not illustrated) in the vicinity of the user equipment 100. Here, the device includes a beacon, a Wi-Fi device, a base station, and an Internet connecting device.

That is, the user equipment control unit 150 checks (or collects/generates) position information of the user equipment 100 through the GPS receiver 160.

Further, the user equipment control unit 150 collects identification information of a beacon (or unique identification information of a store equipped with the beacon) transmitted from the beacon, identification information of a Wi-Fi device transmitted from the Wi-Fi device provided in a specific position, identification information of a base station transmitted from the base station, and an IP address set in the user equipment 100 through an Internet connecting device for Internet connection through the user equipment communication unit 110. In this case, the user equipment control unit 150 may check position information of the beacon corresponding to the identification information of the beacon, position information of the Wi-Fi device corresponding to the identification information of the Wi-Fi device, position information of the base station corresponding to the identification information of the base station, and position information corresponding to the IP address.

Further, the user equipment control unit 150 transmits information on a payment card, a PIN number corresponding to the payment card, collected position information of the user equipment 100, collected position information of one or more devices in the vicinity of the user equipment 100, and identification information of the user equipment 100 to the service providing device 300 through the user equipment communication unit 110.

Further, the user equipment control unit 150 receives authentication failure information transmitted from the service providing device 300 through the user equipment communication unit 100 in response to information on a payment card, a PIN number corresponding to the payment card, collected position information of the user equipment 100, and collected position information of one or more devices in the vicinity of the user equipment 100 which are previously transmitted. Here, the authentication failure information may be information generated when the position information of the user equipment 100 is not located within a predetermined radius from the position information of one or more devices.

Further, the user equipment control unit 150 receives authentication failure information transmitted from the service providing device 300 through the user equipment communication unit 100 in response to the information on a payment card, the PIN number corresponding to the payment card, the collected position information of the user equipment 100, and the collected position information of one or more devices in the vicinity of the user equipment 100 which are previously transmitted. Here, the authentication failure information may be information generated when there is a trial to make a payment in an area out of a movable distance from the user equipment 100 after making the most recent payment through the user equipment 100 and the usage is suspected as illegal usage.

Further, the user equipment control unit 150 outputs the received authentication failure information through the user equipment display unit 130 and/or the user equipment voice output unit 140.

The service providing device 300 communicates with the user equipment 100.

Further, the service providing device 300 receives information on the payment card transmitted from the use equipment 100, the PIN number corresponding to the payment card, position information of the user equipment 100, position information of one or more devices in the vicinity of the user equipment 100, and identification information of the user equipment 100.

Further, the service providing device 300 compares the position information of the user equipment 100 with the position information of one or more devices to determine (check) whether the position of the user equipment 100 is close to the position information of a store (or the device) where an actual payment is performed. In this case, the service providing device 300 determines whether there is position information of the user equipment 100 within a region adjacent to position information of one or more devices for each position information of one or more devices collected in the user equipment 100.

That is, the service providing device 300 determines whether the position information of the user equipment 100 is located within a predetermined radius from the position information of one or more devices.

As a determination result, when the position information of the user equipment 100 is not located within a predetermined radius from the position information of one or more devices, the service providing device 300 confirms that the payment which is made by the payment means of the user equipment 100 is suspected as illegal use to generate authentication failure information (or information indicating that payment is denied due to illegal use) and transmits the generated authentication failure information to the user equipment 100.

Further, as a determination result, when the position information of the user equipment 100 is located within a predetermined radius from the position information of one or more devices, the service providing device 300 confirms that primary verification is normally completed and then checks the payment card type which the most recently makes a payment (used) among one or more payment cards which are issued (or registered) to the service equipment 100, payment date and time information, payment store, position information of the payment store, In this case, there is no payment card which the most recently makes a payment (used) (or there is no payment which is used in a predetermined period (for example, three days)), the service providing device 300 confirms that the authentication is normally completed and then maintains a stand-by state (or a check-in state) for simple payment.

Further, the service providing device 300 calculates a distance difference between position information of the user equipment 100 at the present time and position information of the payment store where the most recently used payment card which is previously checked is used to make a payment. Further, the service providing device 300 calculates a time difference between the present time and payment date and time information when the payment is made by the payment card which the most recently makes a payment (used).

The service providing device 300 checks whether the calculated distance difference and the calculated time difference are equal to or larger than a predetermined reference value (or a predetermined movement time per unit distance).

That is, the service providing device 300 calculates a speed based on the calculated distance difference and the calculated time difference and checks whether the calculated speed is equal to or lower than a predetermined reference speed.

As a checking result, when the calculated distance difference and the calculated time difference are smaller than a predetermined reference value (or a predetermined movement time per unit distance), the service providing device 300 determines that there is a payment trial in an area out of the movable distance from the user equipment 100 after the most recently making a payment and confirms that the illegal use is suspected to generate authentication failure information and transmits the generated authentication failure information to the user equipment 100.

As a checking result, when the calculated distance difference and the calculated time difference are equal to or larger than a predetermined reference value (or a predetermined movement time per unit distance), the service providing device 300 determines that there is an additional payment trial within a movable distance from the user equipment 100 after making the most recent payment to confirm that the authentication is normally completed. Thereafter, the service providing device 300 maintains a standby status (or check-in status) for simple payment.

Further, the service providing device 300 interlocks with the user equipment 100, the POS terminal 400, and the payment server 500 to perform a payment function on one or more products to be paid (or payment product) which are selected to be purchased in the store by the user of the user equipment 100.

According to the exemplary embodiment of the present invention, instead of checking whether to be illegally used by checking whether the same payment card among payment cards registered in the user equipment 100 is used in a different location within a predetermined reference time, after making a payment with some payment cards among entire payment cards issued to the user equipment 100, when the payment is made in another area, it is checked whether the entire payment cards issued to the user equipment is illegally used in accordance with the predetermined reference value. Therefore, it is possible to suppress the entire payment cards issued to the user equipment 100 from being illegally used.

When a user who carries the user equipment 100 enters a store, the user equipment control unit 150 measures a first time from a store entering time to a time of receiving a PIN number corresponding to a payment card selected by the user. Here, a time when unique identification information of the beacon 200 transmitted from the user equipment 100 to the beacon 200 is received may be indicated as a time when the user equipment 100 enters the store.

Further, the user equipment control unit 150 starts measuring a movement distance where the user who carries the user equipment 100 moves from the store entering time to a payment confirming time and tracking a movement route.

Further, the user equipment control unit 150 measures a second time from a time when a PIN number is received to a time when payment is confirmed. Here, a time when electronic payment (or payment with a payment card registered in advance in the user equipment 100) among a plurality of payment methods (for example, cash payment, card payment, and electronic payment) is selected by the user equipment 100 may be indicated as the payment confirming time.

Further, when the user equipment 100 confirms the payment, the user equipment control unit 150 ends measuring a movement distance where the user who carries the user equipment 100 moves from the store entering time to a payment confirming time and tracking a movement route and checks the measured movement distance and the tracked movement route of the user in the store. In this case, the user equipment control unit 150 may convert the movement distance into a number of steps in accordance with a predetermined stride of the user.

Further, the user equipment control unit 150 outputs the measured first time, second time, movement distance, and movement route through the user equipment display unit 130 and/or the user equipment voice output unit 140.

Further, the user equipment control unit 150 transmits the measured first time, second time, movement distance, movement route, and the identification information of the user equipment 100 to the service providing device 300 through the user equipment communication unit 110. Here, the identification information of the user equipment 100 includes a mobile directory number (MDN), a mobile IP, a mobile MAC, a subscriber identify module (Sim) card unique information, and a serial number.

When the first time is not included within an allowable error range of a first reference time and/or the second time is not included within another allowable error range of a second reference time, the user equipment control unit 150 receives an additional authentication request signal transmitted from the service providing device 300 in response to the first time, the second time, the movement distance, and the movement route which are previously transmitted, through the user equipment communication unit 110.

When the additional authentication function is not performed in accordance with the additional authentication request signal received in the user equipment 100, the user equipment control unit 150 does not perform the payment function on one or more products to be paid which are selected by the user by interlocking with the service providing device 300, the POS terminal 400, and the payment server 500.

Further, the user equipment control unit 150 interlocks with the service providing device 300 to perform an additional authentication function (for example, including phone authentication or payment card checking) based on the received additional authentication request signal.

When the first time is not included within an allowable error range of a first reference time and/or the second time is not included within another allowable error range of a second reference time, the user equipment control unit 150 receives authentication failure information transmitted from the service providing device 300 in response to the first time, the second time, the movement distance, and the movement route which are previously transmitted, through the user equipment communication unit 110.

Further, the user equipment control unit 150 displays the received authentication failure information on the user equipment display unit 130.

When the movement distance transmitted from the user equipment 100 is not included within a predetermined reference distance range and/or the movement route transmitted from the user equipment 100 is not included within a predetermined reference route area, the user equipment control unit 150 receives the additional authentication request signal transmitted from the service providing device 300 in response to the first time, the second time, the movement distance, and the movement route which are previously transmitted, through the user equipment communication unit 110.

Further, the user equipment control unit 150 interlocks with the service providing device 300 to perform an additional authentication function (for example, including phone authentication or payment card checking) based on the received additional authentication request signal.

Further, as a determination result, when the movement distance transmitted from the user equipment 100 is not included within a predetermined reference distance range and/or the movement route transmitted from the user equipment 100 is not included within a predetermined reference route area, the user equipment control unit 150 receives the authentication failure information transmitted from the service providing device 300 in response to the first time, the second time, the movement distance, and the movement route which are previously transmitted, through the user equipment communication unit 110.

Further, the user equipment control unit 150 displays the received authentication failure information on the user equipment display unit 130.

The service providing device 300 communicates with the user equipment 100.

Further, the service providing device 300 receives the first time, the second time, the movement distance, the movement route, and the identification information of the user equipment 100 transmitted from the user equipment 100.

Further, the service providing device 300 checks a first reference time until a PIN number is received after entering the store and a second reference time until the payment is confirmed after receiving the PIN number corresponding to the identification information of the user equipment 100 among a plurality of reference time information for every user equipment which is stored in advance.

Further, the service providing device 300 compares the first time transmitted from the user equipment 100 and the previously checked first reference time and compares the second time transmitted from the user equipment 100 and the previously checked second reference time.

That is, the service providing device 300 checks whether the first time transmitted from the user equipment 100 is included within an allowable error range of the previously checked first reference time and checks whether the second time transmitted from the user equipment 100 is included within an allowable error range of the previously checked second reference time.

As a comparison result, when the first time transmitted from the user equipment 100 is not included within an allowable error range of the previously checked first reference time and/or the second time transmitted from the user equipment 100 is not included within an allowable error range of the previously checked second reference time, the service providing device 300 determines that a behavior pattern of the user of the user equipment 100 at the present time is different from an individual behavior pattern which is stored (or set) in advance with respect to the user equipment 100 to request additional authentication to the user equipment 100.

Further, the service providing device 300 interlocks with the user equipment 100 to perform the additional authentication function (for example, including phone authentication or payment card checking) based on the previously requested additional authentication.

When the user equipment 100 rejects the additional authentication in response to the previously requested additional authentication (or an additional authentication request signal), the service providing device 300 does not perform the payment function on one or more products to be paid, which are selected by the user of the user equipment 100 by interlocking with the user equipment 100, the POS terminal 400, and the payment server 500.

Further, as a comparison result, when the first time transmitted from the user equipment 100 is not included within an allowable error range of the previously checked first reference time and/or the second time transmitted from the user equipment 100 is not included within an allowable error range of the previously checked second reference time, the service providing device 300 determines to be illegal use through the payment card to generate authentication failure information (or payment failure information) and transmits the generated authentication failure information to the user equipment 100.

Further, when the first time transmitted from the user equipment 100 is included within an allowable error range of the previously checked first reference time and the second time transmitted from the user equipment 100 is included within an allowable error range of the previously checked second reference time, the service providing device 300 determines whether the movement distance transmitted from the user equipment 100 is within a predetermined reference distance range and determines (or checks) whether the movement route transmitted from the user equipment 100 is within a predetermined reference route area.

As a determination result, when the movement distance transmitted from the user equipment 100 is not included within a predetermined reference distance range and/or the movement route transmitted from the user equipment 100 is not included within a predetermined reference route area, the service providing device 300 determines that a behavior pattern of the user of the user equipment 100 at the present time is different from an individual behavior pattern which is stored (or set) in advance with respect to the user equipment 100 to request additional authentication to the user equipment 100.

Further, the service providing device 300 interlocks with the user equipment 100 to perform the additional authentication function (for example, including phone authentication or payment card checking) based on the previously requested additional authentication.

Further, as a determination result, when the movement distance transmitted from the user equipment 100 is not included within a predetermined reference distance range and/or the movement route transmitted from the user equipment 100 is not included within a predetermined reference route area, the service providing device 300 determines to be illegal use through the payment card to generate authentication failure information (or payment failure information) and transmits the generated authentication failure information to the user equipment 100.

Further, as a determination result, when the movement distance transmitted from the user equipment 100 is included within a predetermined reference distance range and the movement route transmitted from the user equipment 100 is included within a predetermined reference route area, the service providing device 300 determines to be normal use to transmit card information, user information, and benefit information corresponding to the identification information of the user equipment 100 to the payment server 500. Here, the card information includes a card number, an expiration date, a card verification code (CVC) number, and a user name. The user information includes a user name, birth date, an address, and an image. Further, the benefit information includes coupon information, membership benefit information, and discount benefit information.

As described above, since a user's traffic line (or movement route) or movement for every store may have a specific pattern, the service providing device 300 figures out not only a simple movement time pattern and whether a person moves but also a type and a direction of the movement of a person at every timing to make a pattern and determines whether the persons are the same person based thereon by a scoring method.

Further, the service providing device 300 interlocks with the user equipment 100, the POS terminal 400, and the payment server 500 to perform a payment function on one or more products to be paid (or payment product) which are selected to be purchased in the store by the user of the user equipment 100.

As described above, when one or more payment cards related with the user of the user equipment which are registered in the user equipment are used, the user equipment collects various types of position information related with the user equipment and then provides the collected various types of position information to the service providing device and the service providing device compares current position information of the user equipment with various types of position information collected by the user equipment to determine whether the payment card is illegally used.

Further, as described above, when the service providing device compares the current position information of the user equipment with various types of position information collected by the user equipment, previous usage time information of one or more payment cards which are registered to the user equipment is reflected to determine whether the payment card is illegally used.

Further, as described above, time intervals between information exchanging times and personal behavior pattern such as movement of the user which is detected by the user equipment which is a payment means are collected with respect to a plurality of information exchanging times generated during a process of performing pre-authentication type simple payment are collected and analyzed, and then a possibility of illegal payment is determined based on the analyzed result.

Further, as described above, after selecting a payment card for simple payment when a user enters a store, a first time until a PIN number corresponding to a payment card selected by the user is received is measured, a second time until actual payment in accordance with the selection of the product to be paid is confirmed after receiving the PIN number is measured, and the measured first time and second time are compared with the personal behavior pattern corresponding to a user of predetermined user equipment to verify the illegal use of the payment card in accordance with the comparison result.

Hereinafter, a control method of a payment system according to an exemplary embodiment of the present invention will be described in detail with reference to FIGS. 1 to 11.

Figure 5:
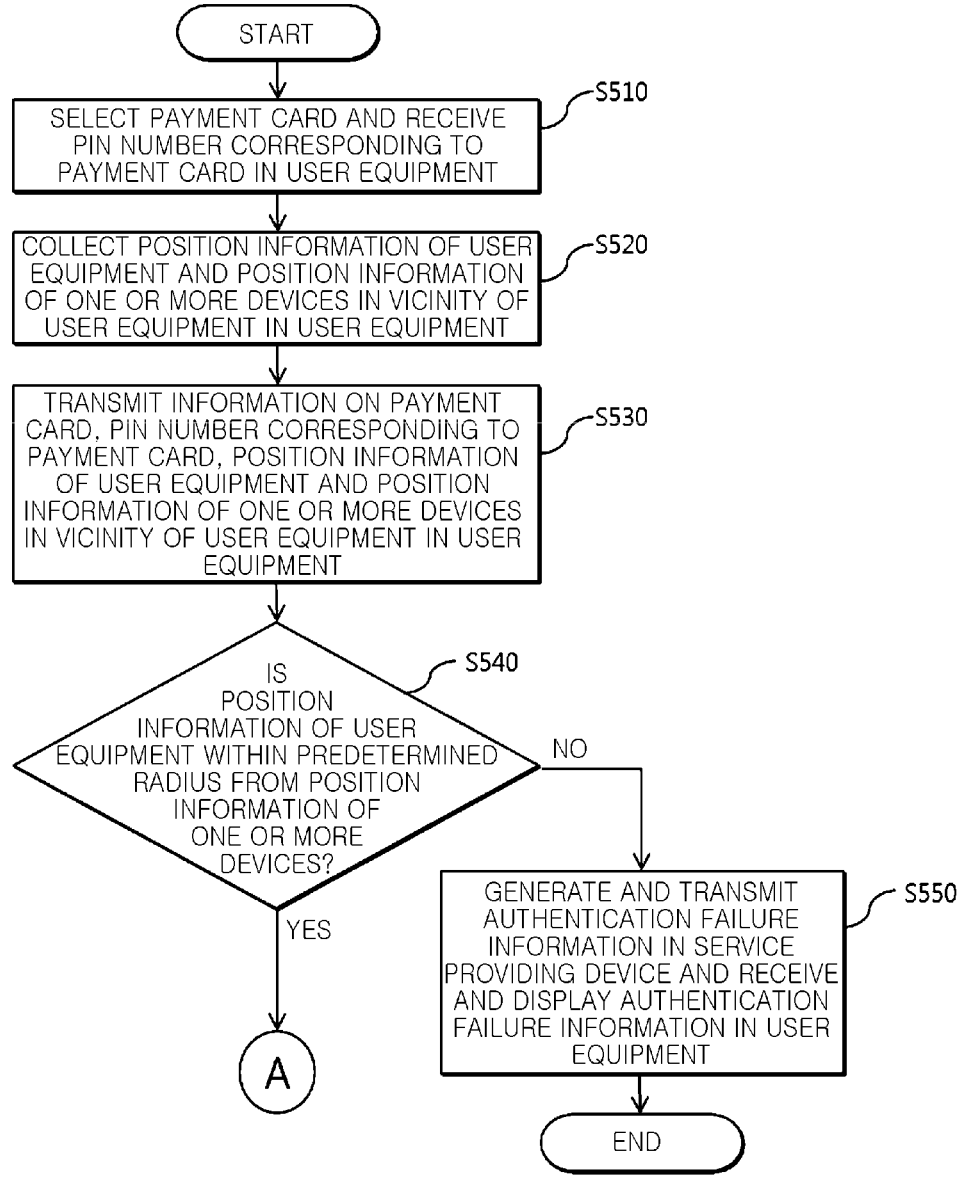
FIGS. 5 and 6 are flow charts illustrating a control method of a payment system according to a first exemplary embodiment of the present invention.
Figure 6:
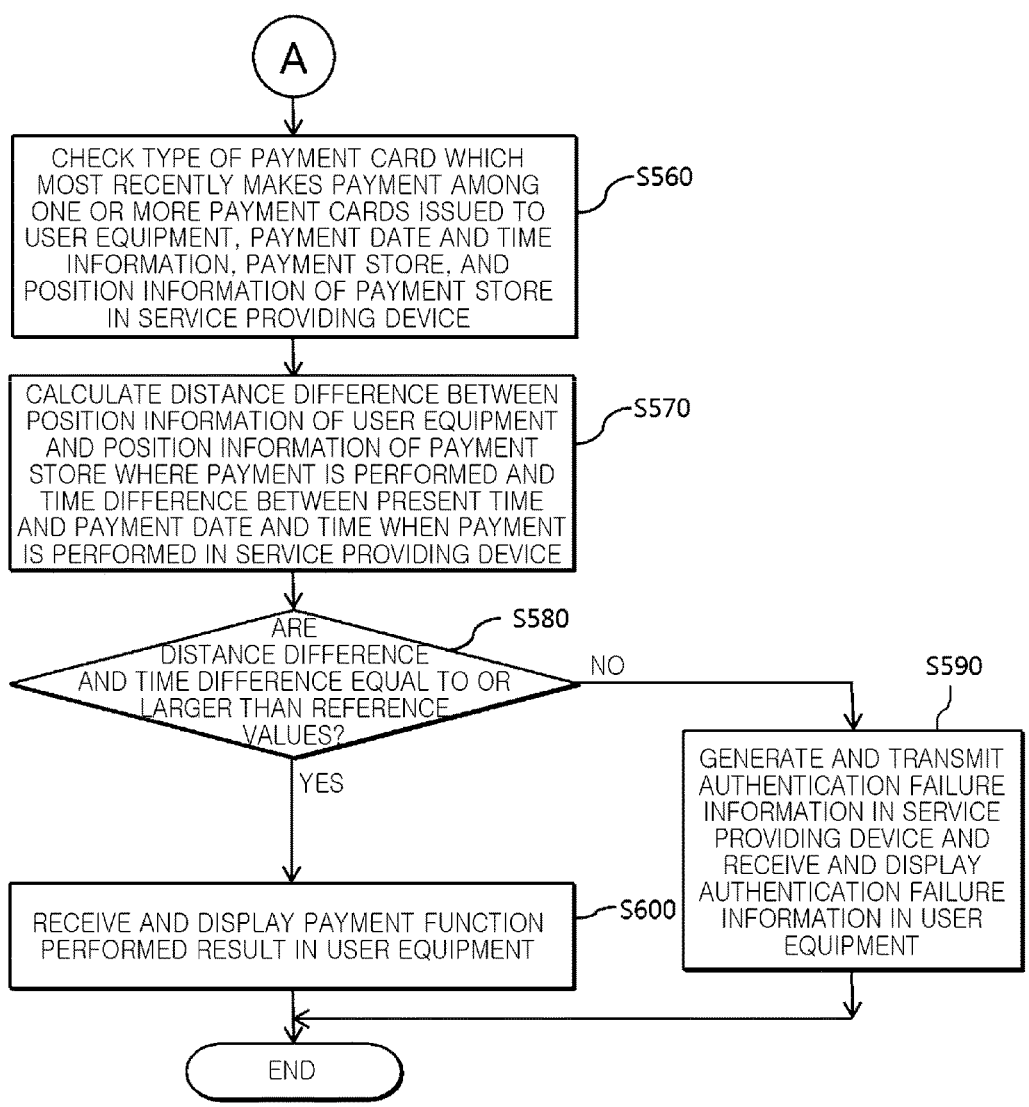

FIGS. 5 and 6 are flow charts illustrating a control method of a payment system according to a first exemplary embodiment of the present invention.

First, when a payment card needs to be selected in accordance with user input (or user selection) and a PIN number corresponding to the selected payment card needs to be received, the user equipment 100 selects one (or a plurality of) payment card among one or more payment cards which are issued (or registered) to the user equipment 100 displayed on the user equipment 100.

Further, the user equipment 100 receives a PIN number corresponding to the selected payment card in accordance with the user input.

For example, the user equipment 100 selects a payment card AA among a plurality of payment cards displayed on the user equipment 100 in accordance with the user's selection and receives a PIN number (for example, 123456) corresponding to the payment card AA in accordance with the input of the user (S510).

The user equipment 100 collects position information of the user equipment 100 and position information of one or more devices (not illustrated) in the vicinity of the user equipment 100. Here, the device includes a beacon, a Wi-Fi device, a base station, and an Internet connecting device.

Further, the user equipment 100 collects identification information of a beacon (or unique identification information of a store equipped with the beacon) transmitted from the beacon, identification information of a Wi-Fi device transmitted from the Wi-Fi device provided in a specific position, identification information of a base station transmitted from the base station, and an IP address set in the user equipment 100 through an Internet connecting device for Internet connection. In this case, the user equipment 100 may check position information of the beacon corresponding to the identification information of the beacon, position information of the Wi-Fi device corresponding to the identification information of the Wi-Fi device, position information of the base station corresponding to the identification information of the base station, and position information corresponding to the IP address.

Figure 7:
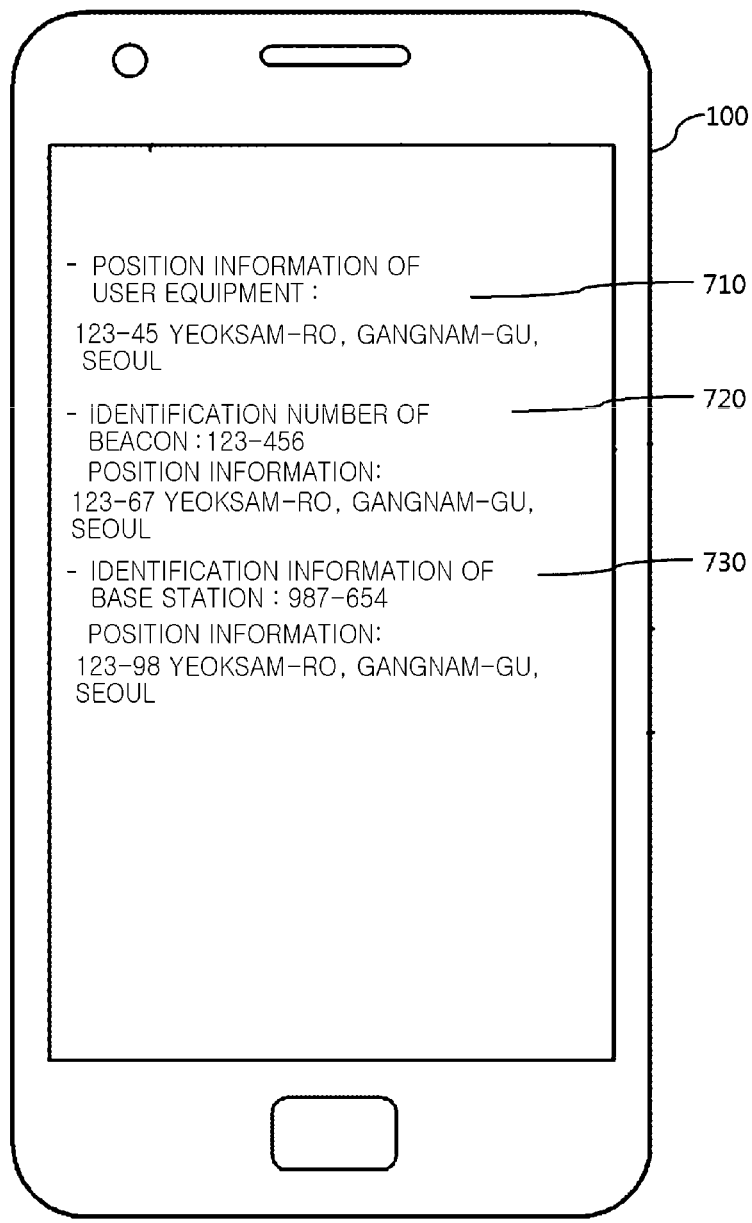
FIG. 7 is a view illustrating a screen of user equipment according to an exemplary embodiment of the present invention.

For example, as illustrated in FIG. 7, the user equipment 100 collects position information 710 of the user equipment 100. Further, as illustrated in FIG. 7, the user equipment 100 collects identification information 720 of the beacon (or unique identification information of a store equipped with the beacon) transmitted from the beacon and identification information 730 of the base station transmitted from the base station (S520).

Next, the user equipment 100 transmits information on the payment card, the PIN number corresponding to the payment card, collected position information of the user equipment 100, collected position information of one or more devices in the vicinity of the user equipment 100, and identification information of the user equipment 100 to the service providing device 300.

For example, the user equipment 100 transmits the information on the payment card AA, the PIN number (for example, 123456) corresponding to the payment card AA, the collected position information of the user equipment 100, the collected identification information of the beacon and identification information of the base station in the vicinity of the user equipment 100 (or unique identification information of a store equipped with the beacon), and the identification information of the user equipment 100 to the service providing device 300 (S530).

Next, the service providing device 300 receives information on the payment card transmitted from the use equipment 100, the PIN number corresponding to the payment card, position information of the user equipment 100, position information of one or more devices in the vicinity of the user equipment 100, and identification information of the user equipment 100.

Further, the service providing device 300 compares the position information of the user equipment 100 with the position information of one or more devices to determine (check) whether the position of the user equipment 100 is close to the position information of a store (or the device) where an actual payment is performed. In this case, the service providing device 300 determines whether there is position information of the user equipment 100 within a region adjacent to position information of one or more devices for each position information of one or more devices collected in the user equipment 100.

That is, the service providing device 300 determines whether the position information of the user equipment 100 is located within a predetermined radius from the position information of one or more devices.

For example, the service providing device 300 determines whether the position information of the user equipment 100 is present within a predetermined radius (for example, 100 meters) of the position information of the beacon corresponding to the identification information of the beacon in the vicinity of the user equipment 100 and the position information of the user equipment 100 is present within another predetermined radius (for example, 500 meters) of the position information of the base station corresponding to the identification information of the base station in the vicinity of the user equipment 100 (S540).

As a determination result, when the position information of the user equipment 100 is not located within a predetermined radius from the position of one or more devices, the service providing device 300 confirms that the payment which is made by the payment means of the user equipment 100 is suspected as illegal use to generate authentication failure information (or information indicating that payment is denied due to illegal use) and transmits the generated authentication failure information to the user equipment 100.

Further, the user equipment 100 receives the authentication failure information transmitted from the service providing device in response to the position information of the user equipment 100 and the position information of one or more devices in the vicinity of the user equipment 100 which are previously transmitted and displays the received authentication failure information.

For example, when the position information of the user equipment 100 is present within another predetermined radius (for example, 500 meters) of the position information of the base station corresponding to the identification information of the base station in the vicinity of the user equipment 100, but the position information of the user equipment 100 is not present within a predetermined radius (for example, 100 meters) of the position information of the beacon corresponding to the identification information of the beacon in the vicinity of the user equipment 100, the service providing device 300 generates authentication failure information and transmits the generated authentication failure information to the user equipment 100. The user equipment 100 receives the authentication failure information transmitted from the service providing device 300 and displays the received authentication failure information (S550).

Further, as a determination result, when the position information of the user equipment 100 is located within a predetermined radius from the position information of one or more devices, the service providing device 300 confirms that primary verification is normally completed and then checks a payment card type of a payment card which the most recently makes a payment (used) among one or more payment cards issued (or registered) to the user equipment 100, payment date and time information, a payment store, and position information of the payment store.

In this case, there is no payment card which the most recently makes a payment (or there is no payment which is used in a predetermined period (for example, three days)), the service providing device 300 confirms that the authentication is normally completed and then maintains a stand-by state (or a check-in state) for simple payment.

For example, when the position information of the user equipment 100 is present within a predetermined radius (for example, 100 meters) of the position information of the beacon corresponding to the identification information of the beacon in the vicinity of the user equipment 100 and the position information of the user equipment 100 is present within another predetermined radius (for example, 500 meters) of the position information of the base station corresponding to the identification information of the base station in the vicinity of the user equipment 100, the service providing device 300 checks a payment card CC which the most recently makes a payment among one or more payment cards issued to the user equipment 100, payment date and time information (for example, at 2:30 P.M. on Aug. 10, 2015), a payment store C, and position information of the payment store C.

As another example, when the position information of the user equipment 100 is present within a predetermined radius (for example, 100 meters) of the position information of the beacon corresponding to the identification information of the beacon in the vicinity of the user equipment 100, the position information of the user equipment 100 is present within another predetermined radius (for example, 500 meters) of the position information of the base station corresponding to the identification information of the base station in the vicinity of the user equipment 100, and the payment function through the payment card issued to the user equipment 100 is not performed within a predetermined period (for example, three days), the service providing device temporarily stores information on a payment card AA, a PIN number (for example, 123456) corresponding to the payment card AA, and the identification information of the user equipment 100 transmitted from the user equipment 100 and maintains a stand-by status (S560).

Further, the service providing device 300 calculates a distance difference between position information of the user equipment 100 at the present time and position information of the payment store where the most recently used payment card which is previously checked is used to make a payment. Further, the service providing device 300 calculates a time difference between the present time and payment date and time information when the payment is made by the most recently used payment card which is previously checked.

For example, the service providing device 300 calculates a first distance difference (for example, 5 km) between the position information of the user equipment 100 and the position information of the payment store C which is previously checked and calculates a first time difference (for example, 12 minutes) between the present time and payment date and time information when the payment is made in the payment store C which is previously checked.

As another example, the service providing device 300 calculates a second distance difference (for example, 10 km) between the position information of the user equipment 100 and the position information of the payment store C which is previously checked and calculates a second time difference (for example, 10 minutes) between the present time and payment date and time information when the payment is made in the payment store C which is previously checked (S570).

Next, the service providing device 300 checks whether the calculated distance difference and the calculated time difference are equal to or larger than a predetermined reference value (or a predetermined movement time per unit distance).

That is, the service providing device 300 calculates a speed based on the calculated distance difference and the calculated time difference and checks whether the calculated speed is equal to or lower than a predetermined reference speed.

For example, the service providing device 300 checks whether the calculated first distance difference (for example, 5 km) and the first calculated time difference (for example, 12 minutes) are equal to or larger than a predetermined movement time per unit distance (for example, 10 minutes per 5 km corresponding to a reference speed 30 km/h).

Further, the service providing device 300 calculates a first speed (for example, 25 km/h) based on the calculated first distance difference (for example, 5 km) and first time difference (for example, 12 minutes) and checks whether the calculated first speed (for example, 25 km/h) is equal to or lower than a predetermined reference speed (for example, 30 km/h).

As another example, the service providing device 300 checks whether the second distance difference (for example, 10 km) and the second time difference (for example, 10 minutes) which are calculated in the service providing device 300 are equal to or larger than a predetermined movement time per unit distance (for example, 20 minutes per 10 km corresponding to a reference speed 30 km/h).

Alternatively, the service providing device 300 calculates a second speed (for example, 60 km/h) based on the calculated second distance difference (for example, 10 km) and second time difference (for example, 10 minutes) and checks whether the calculated second speed (for example, 60 km/h) is equal to or lower than the predetermined reference speed (for example, 30 km/h) (S580).

As a checking result, when the calculated distance difference and the calculated time difference is smaller than a predetermined reference value (or a predetermined movement time per unit distance), the service providing device 300 determines that there is a payment trial in an area out of the movable distance in the user equipment 100 after making a payment the most recently and confirms that the illegal use is suspected to generate authentication failure information and transmits the generated authentication failure information to the user equipment 100.

Further, the user equipment 100 receives the authentication failure information transmitted from the service providing device in response to the position information of the user equipment 100 and the position information of one or more devices in the vicinity of the user equipment 100 which are previously transmitted and displays the received authentication failure information.

For example, when the second distance difference (for example, 10 km) and the second time difference (for example, 10 minutes) which are calculated in the service providing device 300 are smaller than a predetermined movement time per unit distance (for example, 20 minutes per 10 km corresponding to the reference speed 30 km/h) (or 60 km which is the second speed calculated based on the second distance difference and the second time difference is higher than the predetermined reference speed 30 km), the service providing device 300 generates authentication failure information and transmits the generated authentication failure information to the user equipment 100. The user equipment 100 receives the authentication failure information transmitted from the service providing device 300 and displays the received authentication failure information (S590).

As a checking result, when the calculated distance difference and the calculated time difference is equal to or larger than a predetermined reference value (or a predetermined movement time per unit distance), the service providing device 300 determines that there is an additional payment trial within a movable distance from the user equipment 100 after making the most recent payment to confirm that the authentication is normally completed. Thereafter, the service providing device 300 maintains a standby status (or check-in status) for simple payment.

For example, when the calculated first distance difference (for example, 5 km) and the calculated first time difference (for example, 12 minutes) are larger than a predetermined movement time per unit distance (for example, 10 minutes per 5 km corresponding to the reference speed 30 km/h) (or 25 km which is the first speed calculated based on the first distance difference and the first time difference is higher than the predetermined reference speed 30 km), the service providing device 300 temporarily stores information on a payment card AA, a PIN number (for example, 123456) corresponding to the payment card AA, and the identification information of the user equipment 100 transmitted from the user equipment 100 and maintains a stand-by status (S600).

Figure 8:
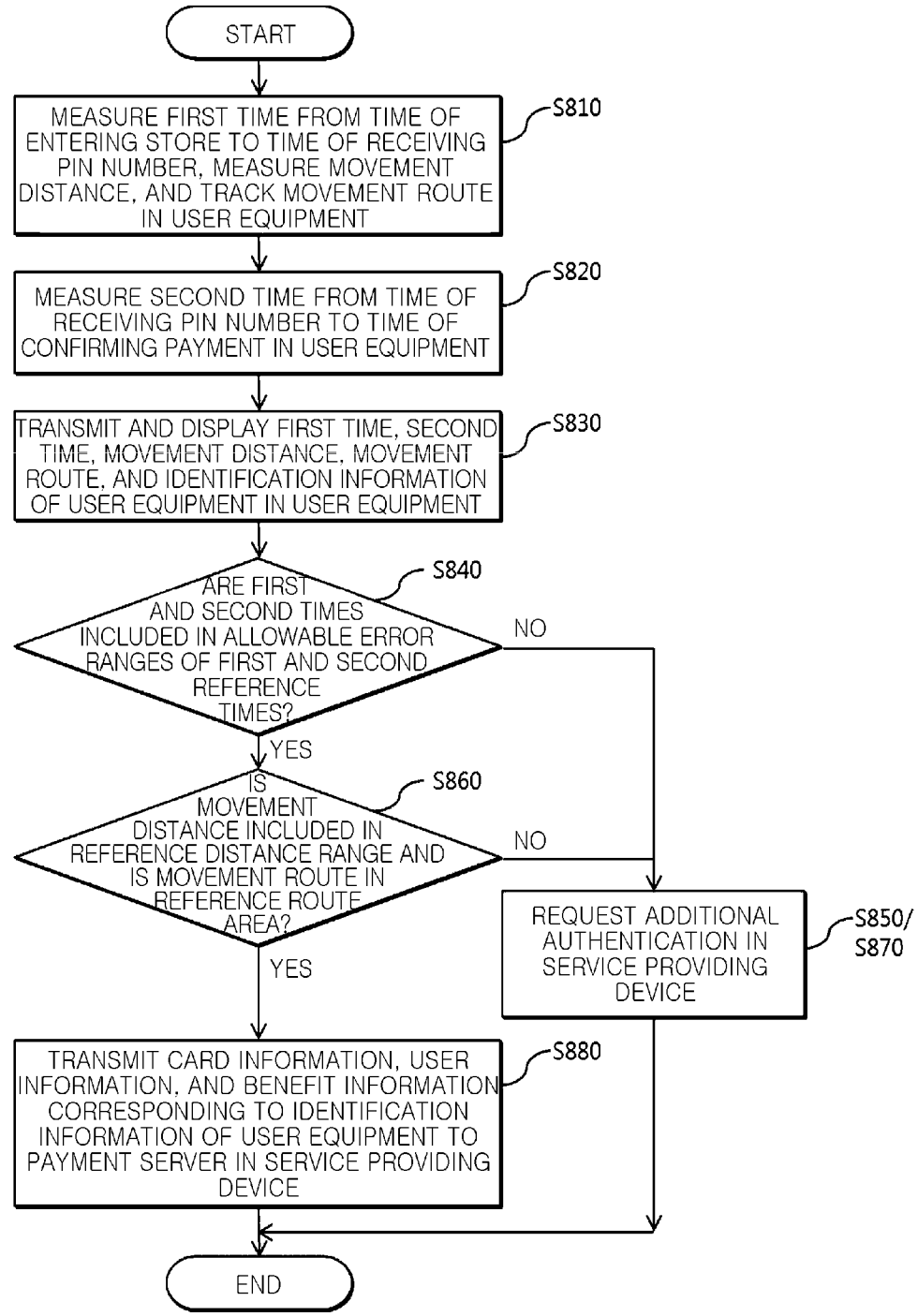
FIG. 8 is a flow chart illustrating a control method of a payment system according to a second exemplary embodiment of the present invention.

FIG. 8 is a flow chart illustrating a control method of a payment system according to a second exemplary embodiment of the present invention.

When a user who carries the user equipment 100 enters a store, the user equipment 100 measures a first time from a store entering time to a time of receiving a PIN number corresponding to a payment card selected by the user. Here, a time when unique identification information of the beacon 200 transmitted from the user equipment 100 to the beacon 200 is received may be indicated as a time when the user equipment 100 enters the store.

Further, the user equipment 100 starts measuring a movement distance where the user who carries the user equipment 100 moves from the store entering time to a payment confirming time and tracking a movement route.

For example, when the user who carries the user equipment 100 enters a store A, the user equipment 100 measures a time 1-1 (for example, 300 seconds) until the user selects one or more products, selects a payment card AA for pre-authentication, and receives a first PIN number 123456 corresponding to the selected payment card AA after receiving identification information of the beacon 200 broadcasted (or transmitted) from the beacon 200 equipped in the store A. Further, the user equipment 100 measures a first movement distance of the user who enters the store A and tracks a first movement route of the user.

As another example, when the user who carries the user equipment 100 enters a store B, the user equipment 100 measures a time 1-2 (for example, 40 seconds) until the user selects a payment card BB for pre-authentication and receives a second PIN number 987654 corresponding to the selected payment card BB after receiving identification information of the beacon 200 broadcasted from the beacon 200 equipped in the store B. Further, the user equipment 100 measures a second movement distance of the user who enters the store B and tracks a second movement route of the user (S810).

Next, the user equipment 100 measures a second time from a time when a PIN number is received to a time when payment is confirmed.

Further, when the user equipment 100 confirms the payment, the user equipment 100 ends measuring a movement distance where the user who carries the user equipment 100 moves from the store entering time to a payment confirming time and tracking a movement route and checks the measured movement distance and the tracked movement route of the user in the store. In this case, the user equipment 100 may convert the movement distance into a number of steps in accordance with a predetermined stride of the user.

For example, the user equipment 100 measures a time 2-1 (for example, 50 seconds) from a time when the first PIN number is received to a time when a payment method (for example, a payment method using a payment card AA registered in an electronic wallet app) for one or more products to be calculated is selected. Further, the user equipment 100 ends measuring the first movement distance (for example, 150 m) where the user who enters the store A moves) and tracking the first movement route.

As another example, the user equipment 100 measures a time 2-2 (for example, 280 seconds) from a time when the second PIN number is received to a time when the user selects one or more products and selects a payment method (for example, a payment method using a payment card BB registered in an electronic wallet app) for one or more products. Further, the user equipment 100 ends measuring the second movement distance (for example, 230 m) where the user who enters the store B moves) and tracking the second movement route (S820).

Further, the user equipment 100 transmits the measured first time, second time, movement distance, movement route, and the identification information of the user equipment 100 to the service providing device 300. Here, the identification information of the user equipment 100 includes a mobile directory number (MDN), a mobile IP, a mobile MAC, a subscriber identify module (Sim) card unique information, and a serial number.

Further, the user equipment 100 displays the measured first time, second time, movement distance, and movement route.

Figure 9:
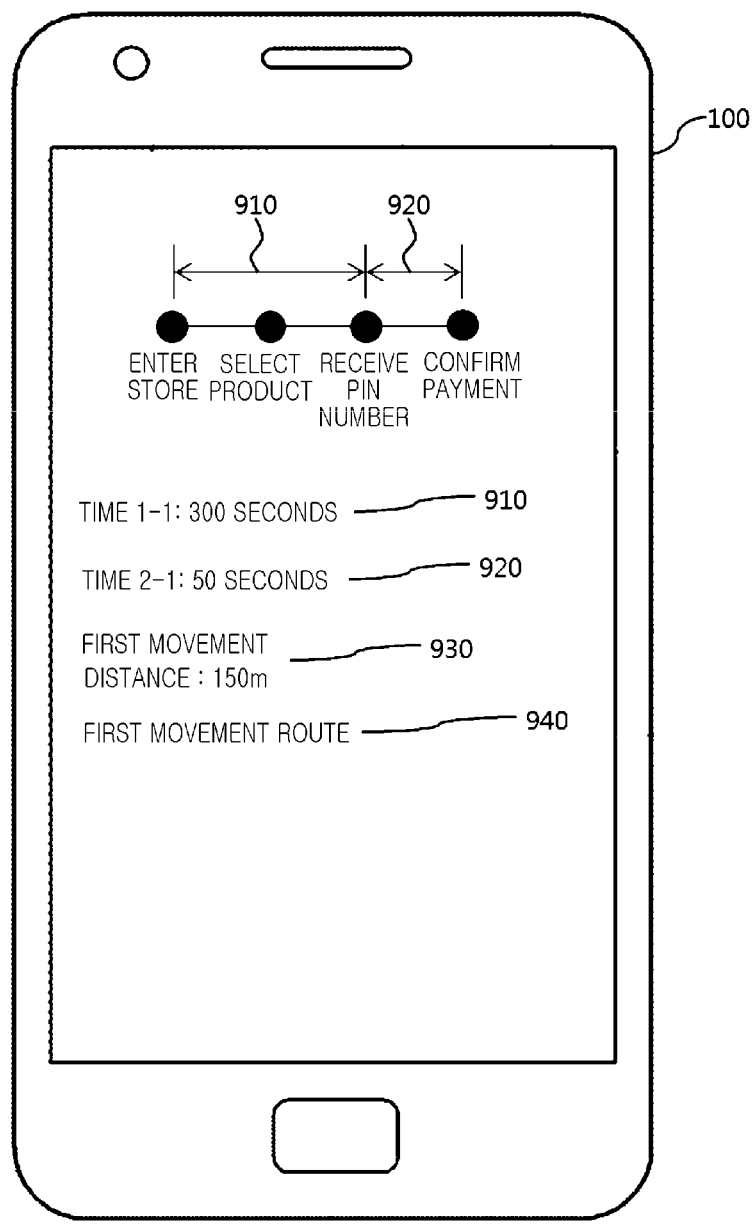
FIGS. 9 to 11 are views illustrating a screen of user equipment according to an exemplary embodiment of the present invention.

For example, the user equipment 100 transmits the time 1-1 (for example, 300 seconds) from a time when the user enters the store A to a time when the user selects one or more products, selects the payment card AA, and receives the first PIN number (for example, 123456) corresponding to the selected payment card AA, the time 2-1 (for example, 50 seconds) from a time when the user receives the first PIN number to a time when the user selects a payment method for one or more products to be calculated, the first movement distance (for example, 150 m) where the user who enters the store A moves), the first movement route where the user who enters the store A moves), and the identification information of the user equipment 100 to the service providing device 300. Further, as illustrated in FIG. 9, the user equipment 100 displays the time 1-1 (for example, 300 seconds) 910 from a time when the user enters the store A to a time when the user selects one or more products, selects the payment card AA, and receives the first PIN number (for example, 123456) corresponding to the selected payment card AA, the time 2-1 (for example, 50 seconds) 920 from a time when the user receives the first PIN number to a time when the user selects a payment method for one or more products to be calculated, the first movement distance (for example, 150 m) 930 where the user who enters the store A moves, and the first movement route 940 where the user who enters the store A moves.

Figure 10:
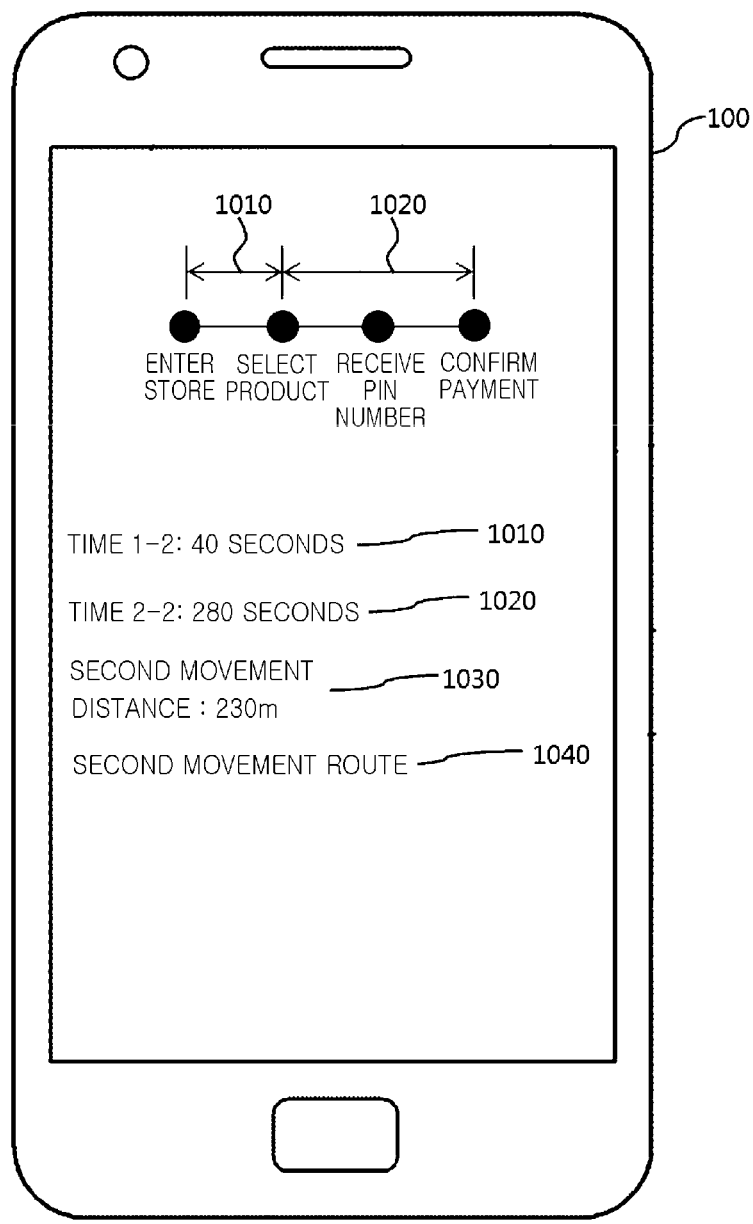

As another example, the user equipment 100 transmits the time 1-2 (for example, 40 seconds) from a time when the user enters the store B to a time when the user selects the payment card BB and receives the second PIN number (for example, 987654) corresponding to the selected payment card BB, the time 2-2 (for example, 280 seconds) from a time when the user receives the second PIN number to a time when the user selects one or more products and selects a payment method for one or more selected products, the second movement distance (for example, 230 m) where the user who enters the store B moves, the second movement route where the user who enters the store B moves, and the identification information of the user equipment 100 to the service providing device 300. Further, as illustrated in FIG. 10, the user equipment 100 displays a time 1-2 (for example, 40 seconds) 1010 from a time when the user enters the store B to a time when the user selects the payment card BB, and receives the second PIN number (for example, 987654) corresponding to the selected payment card BB, the time 2-2 (for example, 280 seconds) 1020 from a time when the user receives the second PIN number to a time when the user selects one or more products and selects a payment method for one or more selected products, the second movement distance (for example, 230 m) 1030 where the user who enters the store B moves, and the second movement route 1040 where the user who enters the store B moves (S830).

Next, the service providing device 300 receives the first time, the second time, the movement distance, the movement route, and the identification information of the user equipment 100 transmitted from the user equipment 100.

Further, the service providing device 300 checks a first reference time until a PIN number is received after entering the store and a second reference time until the payment is confirmed after receiving the PIN number corresponding to the identification information of the user equipment 100 among a plurality of reference time information for every user equipment which is stored in advance.

Further, the service providing device 300 compares the first time transmitted from the user equipment and the previously checked first reference time and compares the second time transmitted from the user equipment and the previously checked second reference time.

That is, the service providing device 300 checks whether the first time transmitted from the user equipment 100 is included within an allowable error range of the previously checked first reference time and checks whether the second time transmitted from the user equipment 100 is included within an allowable error range of the previously checked second reference time.

For example, the service providing device 300 checks whether the time 1-1 (for example, 300 seconds) is included in a first allowable error range (for example, 270 to 330 seconds when the allowable error is ±10%) of a predetermined reference time 1-1 (for example, 300 seconds) corresponding to the identification information of the user equipment 100 and the time 2-1 (for example, 50 seconds) is included in a second allowable error range (for example, 36 to 44 seconds when the allowable error is ±10%) of a predetermined reference time 2-1 (for example, 40 seconds) corresponding to the identification information of the user equipment 100.

As another example, the service providing device 300 checks whether the time 1-2 (for example, 40 seconds) is included in a third allowable error range (for example, 36 to 44 seconds when the allowable error is ±10%) of a predetermined reference time 1-2 (for example, 40 seconds) corresponding to the identification information of the user equipment 100 and the time 2-2 (for example, 280 seconds) is included in a fourth allowable error range (for example, 270 to 330 seconds when the allowable error is ±10%) of a predetermined reference time 2-2 (for example, 300 seconds) corresponding to the identification information of the user equipment 100 (S840).

As a comparison result, when the first time transmitted from the user equipment 100 is not included within an allowable error range of the previously checked first reference time and/or the second time transmitted from the user equipment 100 is not included within an allowable error range of the previously checked second reference time, the service providing device 300 determines that a behavior pattern of the user of the user equipment 100 at the present time is different from an individual behavior pattern which is stored (or set) in advance with respect to the user equipment 100 to request additional authentication to the user equipment 100.

Further, the service providing device 300 interlocks with the user equipment 100 to perform the additional authentication function (for example, including phone authentication or payment card checking) based on the previously requested additional authentication.

For example, when the time 1-1 (for example, 300 seconds) is included in the first allowable error range (for example, 270 to 330 seconds when the allowable error is ±10%) of the predetermined reference time 1-1 (for example, 300 seconds) corresponding to the identification information of the user equipment 100 and the time 2-1 (for example, 50 seconds) is not included in the second allowable error range (for example, 36 to 44 seconds when the allowable error is ±10%) of a predetermined reference time 2-1 (for example, 40 seconds) corresponding to the identification information of the user equipment 100, the service providing device 300 determines that a behavior pattern of the user of the user equipment 100 at the present time is different from an individual behavior pattern which is stored (or set) in advance with respect to the user equipment 100 to interlock with the user equipment to perform an additional authentication function.

Further, as a comparison result, when the first time transmitted from the user equipment 100 is not included within an allowable error range of the previously checked first reference time and/or the second time transmitted from the user equipment 100 is not included within an allowable error range of the previously checked second reference time, the service providing device 300 determines to be illegal use through the payment card to generate authentication failure information (or payment failure information) and transmits the generated authentication failure information to the user equipment 100.

The user equipment 100 receives the authentication failure information transmitted from the service providing device 300 and displays the received authentication failure information (S850).

Further, when the first time transmitted from the user equipment 100 is included within an allowable error range of the previously checked first reference time and the second time transmitted from the user equipment 100 is included within an allowable error range of the previously checked second reference time, the service providing device 300 determines whether the movement distance transmitted from the user equipment 100 is within a predetermined reference distance range and determines (or checks) whether the movement route transmitted from the user equipment 100 is within a predetermined reference route area.

For example, when the time 1-2 (for example, 40 seconds) is included in the third allowable error range (for example, 36 to seconds when the allowable error is ±10%) of the predetermined reference time 1-2 (for example, 40 seconds) corresponding to the identification information of the user equipment 100 and the time 2-2 (for example, 280 seconds) is included in the fourth allowable error range (for example, 270 to 330 seconds when the allowable error is ±10%) of the predetermined reference time 2-2 (for example, 300 seconds) corresponding to the identification information of the user equipment 100, the service providing device 330 determines whether a second movement distance (for example, 230 m) is included in a predetermined reference distance range (for example, 184 to 276 m when the allowable error of ±20% is applied to the reference movement distance 230 m) corresponding to the identification information of the user equipment 100 and a second movement route (for example, a region within a radius of 50 m) is included in a predetermined reference route area (for example, a region within a radius of 50 m from an entrance of the store B) corresponding to the identification information of the user equipment 100.

As another example, when the time 1-2 (for example, 40 seconds) is included in the third allowable error range (for example, 36 to 44 seconds when the allowable error is ±10%) of the predetermined reference time 1-2 (for example, 40 seconds) corresponding to the identification information of the user equipment 100 and the time 2-2 (for example, 280 seconds) is included in the fourth allowable error range (for example, 270 to 330 seconds when the allowable error is ±10%) of the predetermined reference time 2-2 (for example, 300 seconds) corresponding to the identification information of the user equipment 100, the service providing device 330 determines whether a movement distance 2-2 (for example, 180 m) is included in a predetermined reference distance range 1-2 (for example, 184 to 276 m when the allowable error of ±10% and the reference movement distance is 230 m) corresponding to the identification information of the user equipment 100 and the second movement route is included in a predetermined reference route area 1-2 (for example, a region within a radius of 70 m from the POS terminal of the store B) corresponding to the identification information of the user equipment 100 (S860).

As a comparison result, when the movement distance transmitted from the user equipment 100 is within a predetermined reference distance range and/or the movement route transmitted from the user equipment 100 is within a predetermined reference route area, the service providing device 300 determines that a behavior pattern of the user of the user equipment 100 at the present time is different from an individual behavior pattern which is stored (or set) in advance with respect to the user equipment 100 to request additional authentication to the user equipment 100.

Further, the service providing device 300 interlocks with the user equipment 100 to perform the additional authentication function (for example, including phone authentication or payment card checking) based on the previously requested additional authentication.

Figure 11:
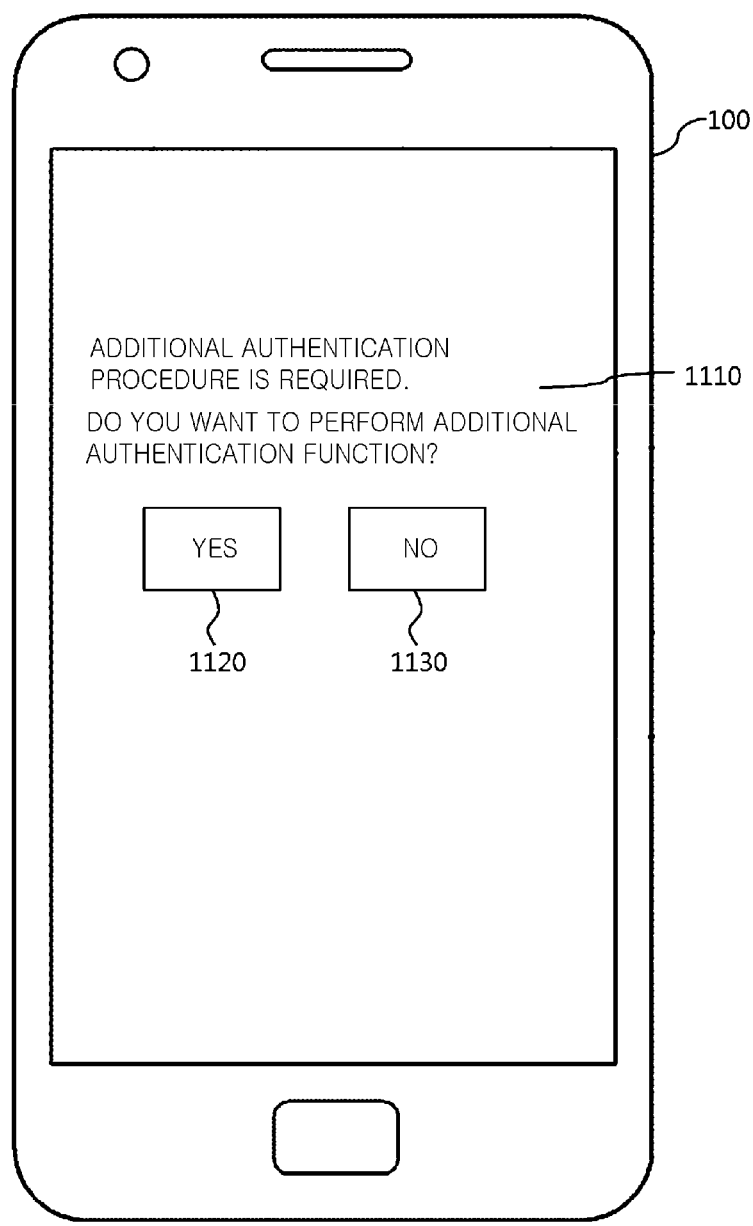

For example, when the movement distance 2-2 (for example, 180 m) is not included in the predetermined reference distance range 1-2 (for example, 184 to 276 m when the allowable error of ±10% and the reference movement distance is 230 m) corresponding to the identification information of the user equipment 100 and the second movement route is included in the predetermined reference route area 1-2 (for example, a region within a radius of 70 m from the POS terminal of the store B) corresponding to the identification information of the user equipment 100, the service providing device 300 determines that the behavior pattern of the user of the user equipment 100 at the present time is different from an individual behavior pattern which is stored (or set) in advance with respect to the user equipment 100 to transmit an additional authentication request signal to the user equipment 100. As illustrated in FIG. 11, the user equipment 100 displays additional authentication request information 1110 corresponding to the additional authentication request signal transmitted from the service providing device 300. Further, when a predetermined set button 1120 is selected to perform an additional authentication function on the additional authentication request information 1110 illustrated in FIG. 11, the user equipment 100 interlocks with the service providing device 300 to perform the additional authentication function. Further, when a predetermined another button 1130 is selected so as not to perform the additional authentication function on the additional authentication request information 1110 illustrated in FIG. 11, the user equipment 100 ends the entire process.

Further, as a determination result, when the movement distance transmitted from the user equipment 100 is within a predetermined reference distance range and/or the movement route transmitted from the user equipment 100 is within a predetermined reference route area, the service providing device 300 determines to be illegal use through the payment card to generate authentication failure information (or payment failure information) and transmits the generated authentication failure information to the user equipment 100.

The user equipment 100 receives the authentication failure information transmitted from the service providing device 300 and displays the received authentication failure information (S870).

Further, as a determination result, when the movement distance transmitted from the user equipment 100 is included within a predetermined reference distance range and the movement route transmitted from the user equipment 100 is included within a predetermined reference route area, the service providing device 300 determines to be normal use to transmit card information, user information, and benefit information corresponding to the identification information of the user equipment 100 to the payment server 500. Here, the card information includes a card number, an expiration date, a card verification code (CVC) number, and a user name. The user information includes a user name, birth date, an address, and an image. Further, the benefit information includes coupon information, membership benefit information, and discount benefit information.

Further, the service providing device 300 interlocks with the user equipment 100, the POS terminal 400, and the payment server 500 to perform a payment function on one or more products to be paid (or payment product) which are selected to be purchased in the store by the user of the user equipment 100.

For example, when the second movement distance (for example, 230 m) is included in the predetermined reference distance range 1-1 (for example, 184 to 276 m when the allowable error of ±20% is applied to the reference movement distance 230 m) and the second movement route is included in the predetermined reference route area 1-1 (for example, a region within a radius of 50 m from an entrance of the store B) corresponding to the identification information of the user equipment 100, the service providing device 300 determines that the payment card is normally used to transmit card information, user information, and benefit information corresponding to the identification information of the user equipment 100 to the payment server 500 (S880).

The user equipment, the service providing device, the POS terminal, and the payment system including the same according to the embodiment of the present invention may be prepared with a computer program, and codes and code segments configuring the computer program may easily deduced by a computer programmer in the art. Further, the corresponding computer program is stored in a non-transitory computer readable storage medium, and read and executed by the computer or the user equipment, the beacon, the service providing device, the POS terminal, and the payment server according to the exemplary embodiment of the present invention to implement the user equipment, the service providing device, the POS terminal, and the payment system including the same.

The non-transitory computer readable storage medium includes a magnetic storage medium, an optical storage medium, and a carrier wave medium. The computer program implementing the user equipment, the service providing device, the POS terminal, and the payment system including the same according to the embodiment of the present invention may be stored and installed in embedded memories of the user equipment, the beacon, the service providing device, the POS terminal, and the payment server. Alternatively, external memories such as a smart card storing and installing the computer program implementing the user equipment, the service providing device, the POS terminal, and the payment system including the same according to the embodiment of the present invention may be installed on the user equipment, the beacon, the service providing device, the POS terminal, and the payment server through an interface.

As described above, according to the present invention, when one or more payment cards related with a user of user equipment registered in the user equipment are used, the user equipment collects various types of position information related with the user equipment and then provides the various types of collected position information to the service providing device, the service providing device compares current position information of the user equipment with various types of position information collected in the user equipment to determine whether the payment card is illegally used. Therefore, it is possible to verify illegal usage which steals the user equipment or steals position information of a store and increase reliability of determining illegal usage.

Further, according to the present invention, when the service providing device compares current position information of the user equipment with various types of position information collected in the user equipment, previous usage time information of one or more payment cards registered in the user equipment is reflected to determine whether the payment card is illegally used. Therefore, the illegal usage may be verified through a plurality of steps and it may be used as information for recommending payment means or analyzing a consumption pattern.

Further, according to the present invention, time intervals between information exchanging times and personal behavior pattern such as movement of the user which is detected by the user equipment which is a payment means are collected with respect to a plurality of information exchanging times generated during a process of performing preauthentication type simple payment are collected and analyzed, and then a possibility of illegal payment is determined based on the analyzed result, so that illegal use by a third party or illegal use by a hacking tool may be suppressed.

Further, as described above, after selecting a payment card for simple payment when a user enters a store, a first time until a PIN number corresponding to a payment card selected by the user is received is measured, a second time until actual payment in accordance with the selection of the product to be paid is confirmed after receiving the PIN number is measured, and the measured first time and second time are compared with the personal behavior pattern corresponding to a user of predetermined user equipment to verify the illegal use of the payment card in accordance with the comparison result, thereby verifying illegal use which steals the user equipment or steals the position information of the store and increasing reliability of determining illegal use.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description. Therefore, the spirit of the present invention should not be limited to the above-described embodiments and the following claims as well as all modified equally or equivalently to the claims are intended to fall within the scope and spirit of the invention.

According to the present invention, when one or more payment cards related with a user of user equipment registered in the user equipment are used, the user equipment collects various types of position information related with the user equipment and then provides the various types of collected position information to the service providing device, the service providing device compares current position information of the user equipment with various types of position information collected in the user equipment to determine whether the payment card is illegally used. Therefore, it is possible to verify illegal usage which steals the user equipment or steals position information of a store and increase reliability of determining illegal usage. As a result, the present invention may be broadly used in various fields such as a simple payment field, an advertisement field, a service providing device field, a user equipment field, a POS terminal field, and a payment server field.

What is claimed is:
1. A service providing device, comprising:
a communication unit which receives information on a payment card, a PIN number corresponding to the payment card, position information of user equipment of a user attempting to purchase an item at a physical payment store, position information of one or more devices in the vicinity of the user equipment, and identification information of the user equipment which are transmitted from the user equipment, wherein the one or more devices that are in the vicinity of the user equipment are located at the physical payment store; and
a control unit which determines whether the position information of the user equipment is located within a predetermined radius from the position information of the one or more devices located at the physical payment store for primary verification of the purchase, checks a type of the payment card from among one or more payment cards issued to the user equipment that is being used to purchase the item, payment date and time information associated with the attempted purchase of the item at the physical store, and position information of the physical payment store when the position information of the user equipment is located within the predetermined radius from the position information of the one or more devices located at the physical payment store as a determination result, and performs secondary verification based on a distance difference between the position information of the user equipment and position information of the physical payment store where the payment is made by the payment card and a time difference between a present time and the payment date and time information when the payment is made by the payment card.

2. The service providing device of claim 1, wherein when the position information of the user equipment is not located within the predetermined radius from the position information of the one or more devices as the determination result, the control unit generates authentication failure information and controls the communication unit to transmit the generated authentication failure information to the user equipment.

3. The service providing device of claim 1, wherein when the position information of the user equipment is located within the predetermined radius from the position information of the one or more devices as the determination result but there is no payment made with the payment card within a predetermined period, the control unit maintains a stand-by status for simple payment.

4. The service providing device of claim 1, wherein the control unit checks whether the calculated distance difference and time difference are equal to or larger than predetermined reference values and suspects that the payment card is illegally used when the calculated distance difference and time difference are smaller than the predetermined reference values as a checking result to generate authentication failure information and controls the communication unit to transmit the generated authentication failure information to the user equipment.

5. The service providing device of claim 1, wherein the control unit checks whether the calculated distance difference and time difference are equal to or larger than predetermined reference values and maintains a stand-by status for simple payment when the calculated distance difference and time difference are equal to or larger than the predetermined reference values as a checking result.

6. A service providing device, comprising:
a communication unit which receives a first time duration based on a time when a user who carries a user equipment enters a store to a time when the user equipment receives a PIN number corresponding to a payment card of the user, a second time duration based on the time when the user equipment receives the PIN number to a time when the user confirms a payment using the payment card, a movement distance of the user from the time when the user enters the store to the time when the user confirms the payment, a movement route, and identification information of the user equipment which are transmitted from the user equipment; and
a control unit which determines whether to perform additional authentication on the user equipment, based on a comparison result between the received first time duration, the second time duration, the movement distance, and the movement route and reference values which are stored in advance according to the identification information of the user equipment.

7. The service providing device of claim 6, wherein the control unit checks whether the first time duration is included within an allowable error range of a first reference time corresponding to the identification information of the user equipment and the second time duration is included within an allowable error range of a second reference time corresponding to the identification information of the user equipment.

8. The service providing device of claim 7, wherein when the first time duration is not included within the allowable error range of the first reference time corresponding to the identification information of the user equipment and/or the second time duration is not included within the allowable error range of the second reference time corresponding to the identification information of the user equipment, the control unit determines that a behavior pattern of the user is different from an individual behavior pattern for the user which is stored in advance with respect to the user equipment to perform an additional authentication procedure by interlocking with the user equipment.

9. The service providing device of claim 7, wherein when the first time duration is included within the allowable error range of the first reference time corresponding to the identification information of the user equipment and the second time duration is included within the allowable error range of the second reference time corresponding to the identification information of the user equipment, the control unit determines whether the movement distance is included in a predetermined reference distance range corresponding to the identification information of the user equipment and the movement route is included in a predetermined reference route area corresponding to the identification information of the user equipment.

10. The service providing device of claim 9, wherein when the movement distance is not included in the predetermined reference distance range corresponding to the identification information of the user equipment and/or the movement route is not included in the predetermined reference route area corresponding to the identification information of the user equipment, the control unit determines that a behavior pattern of the user is different from an individual behavior pattern for the user which is stored in advance with respect to the user equipment to perform an additional authentication process by interlocking with the user equipment.

11. The service providing device of claim 9, wherein when the movement distance is included in the predetermined reference distance range and the movement route is included in the predetermined reference route area, the control unit determines that the payment card is normally used to control the communication unit to transmit card information, user information, and benefit information corresponding to the identification information of the user equipment to the payment server.

12. A control method of a service providing device, the method comprising:
receiving information on a payment card, a PIN number corresponding to the payment card, position information of user equipment of a user attempting to purchase an item at a physical payment store, position information of one or more devices in the vicinity of the user equipment, and identification information of the user equipment which are transmitted from the user equipment by means of a communication unit, wherein the one or more devices that are in the vicinity of the user equipment are located at the physical payment store;
determining whether the position information of the user equipment is located within a predetermined radius from the position information of the one or more devices located at the physical payment store, for primary verification of the purchase, by means of a control unit;
checking a type of the payment card from among one or more payment cards issued to the user equipment that is being used to purchase the item, payment date and time information associated with the attempted purchase of the item at the physical store, and position information of the physical payment store by means of the control unit when the position information of the user equipment is located within the predetermined radius from the position information of the one or more devices located at the physical payment store as a determination result;

calculating a distance difference between the position information of the user equipment and the position information of the physical payment store where the payment is made using the payment card and a time difference between a present time and the payment date and time information when the payment is made using the payment card, by means of the control unit;

calculating a speed based on the calculated distance difference and the calculated time difference, by means of the control unit;

checking whether the calculated speed is equal to or lower than a predetermined reference speed, by means of the control unit; and confirming that authentication is normally completed by determining there is an additional payment trial within a movable distance from the user equipment and maintaining a stand-by status for simple payment by means of the control unit when the calculated speed is equal to or lower than the reference speed as a checking result.

13. The control method of claim 12, further comprising:
maintaining a stand-by status for simple payment, by means of the control unit, when the position information of the user equipment is located within the predetermined radius from the position information of the one or more devices as the determination result but there is no payment made using the payment card within a predetermined period;

generating authentication failure information, by means of the control unit, when the position information of the user equipment is not located within the predetermined radius from the position information of the one or more devices as the determination result;

and transmitting the generated authentication failure information to the user equipment, by means of the communication unit.

14. The control method of claim 12, further comprising:
generating authentication failure information, by means of the control unit, when the calculated speed is higher than the reference speed, as the checking result; and
transmitting the generated authentication failure information to the user equipment, by means of the communication unit.

15. A non-transitory computer-readable storage medium storing a computer program recorded thereon configured to perform a method comprising:
receiving information on a payment card, a PIN number corresponding to the payment card, position information of user equipment of a user attempting to purchase an item at a physical payment store, position information of one or more devices in the vicinity of the user equipment, and identification information of the user equipment which are transmitted from the user equipment by means of a communication unit, wherein the one or more devices that are in the vicinity of the user equipment are located at the physical payment store;

determining whether the position information of the user equipment is located within a predetermined radius from the position information of the one or more devices located at the physical payment store, for primary verification of the purchase, by means of a control unit;

checking a type of the payment card from among one or more payment cards issued to the user equipment that is being used to purchase the item, payment date and time information associated with the attempted purchase of the item at the physical store, and position information of the physical payment store by means of the control unit when the position information of the user equipment is located within the predetermined radius from the position information of the one or more devices located at the physical payment store as a determination result;

calculating a distance difference between the position information of the user equipment and the position information of the physical payment store where the payment is made using the payment card and a time difference between a present time and the payment date and time information when the payment is made using the payment card, by means of the control unit;

calculating a speed based on the calculated distance difference and the calculated time difference, by means of the control unit;

checking whether the calculated speed is equal to or lower than a predetermined reference speed, by means of the control unit; and confirming that authentication is normally completed by determining there is an additional payment trial within a movable distance from the user equipment and maintaining a stand-by status for simple payment by means of the control unit when the calculated speed is equal to or lower than the reference speed as a checking result.

16. The non-transitory computer-readable storage medium of claim 15, wherein the method further comprises:
maintaining a stand-by status for simple payment, by means of the control unit, when the position information of the user equipment is located within the predetermined radius from the position information of the one or more devices as the determination result but there is no payment made using the payment card within a predetermined period;

generating authentication failure information, by means of the control unit, when the position information of the user equipment is not located within the predetermined radius from the position information of the one or more devices as the determination result;

and transmitting the generated authentication failure information to the user equipment, by means of the communication unit.

17. The non-transitory computer-readable storage medium claim 15, wherein the method further comprises:
generating authentication failure information, by means of the control unit, when the calculated speed is higher than the reference speed, as the checking result and transmitting the generated authentication failure information to the user equipment, by means of the communication unit.

* * * * *